US011831565B2

(12) United States Patent
Donley et al.

(10) Patent No.: US 11,831,565 B2
(45) Date of Patent: Nov. 28, 2023

(54) METHOD FOR MAINTAINING CACHE CONSISTENCY DURING REORDERING

(71) Applicant: Advanced Micro Devices, Inc., Santa Clara, CA (US)

(72) Inventors: Greggory D. Donley, San Jose, CA (US); Bryan P. Broussard, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/150,520

(22) Filed: Oct. 3, 2018

(65) Prior Publication Data

US 2020/0112525 A1    Apr. 9, 2020

(51) Int. Cl.
| | |
|---|---|
| *H04L 49/90* | (2022.01) |
| *H04L 45/74* | (2022.01) |
| *H04L 45/745* | (2022.01) |
| *H04L 47/62* | (2022.01) |
| *H04L 47/6295* | (2022.01) |
| *H04L 49/253* | (2022.01) |
| *G06F 12/1072* | (2016.01) |

(52) U.S. Cl.
CPC ............ *H04L 49/90* (2013.01); *H04L 45/742* (2013.01); *H04L 45/745* (2013.01); *H04L 47/622* (2013.01); *H04L 47/624* (2013.01); *H04L 47/6295* (2013.01); *H04L 49/254* (2013.01)

(58) Field of Classification Search
CPC ..... H04L 49/90; H04L 45/742; H04L 45/745; H04L 47/622; H04L 47/624; H04L 47/6295; H04L 49/254

USPC ......................................................... 370/412
See application file for complete search history.

(56) References Cited

U.S. PATENT DOCUMENTS

| | | | |
|---|---|---|---|
| 5,031,174 | A | 7/1991 | Natsume |
| 7,383,423 | B1 | 6/2008 | Hughes et al. |
| | | (Continued) | |

OTHER PUBLICATIONS

International Search Report and Written Opinion in International Application No. PCT/US2016/046886, dated Nov. 23, 2016, 12 pages.

(Continued)

*Primary Examiner* — Kwang B Yao
*Assistant Examiner* — Xuan Lu
(74) *Attorney, Agent, or Firm* — KOWERT HOOD MUNYON RANKIN AND GOETZEL PC; Rory D. Rankin

(57) ABSTRACT

Systems, apparatuses, and methods for performing efficient data transfer in a computing system are disclosed. A computing system includes multiple fabric interfaces in clients and a fabric. A packet transmitter in the fabric interface includes multiple queues, each for storing packets of a respective type, and a corresponding address history cache for each queue. Queue arbiters in the packet transmitter select candidate packets for issue and determine when address history caches on both sides of the link store the upper portion of the address. The packet transmitter sends a source identifier and a pointer for the request in the packet on the link, rather than the entire request address, which reduces the size of the packet. The queue arbiters support out-of-order issue from the queues. The queue arbiters detect conflicts with out-of-order issue and adjust the outbound packets and fields stored in the queue entries to avoid data corruption.

20 Claims, 10 Drawing Sheets

(56) References Cited

U.S. PATENT DOCUMENTS

| | | | |
|---|---|---|---|
| 7,519,777 B1* | 4/2009 | Ekanadham | G06F 9/383 |
| | | | 711/137 |
| 7,526,607 B1* | 4/2009 | Singh | G06F 12/0866 |
| | | | 711/216 |
| 9,667,723 B2 | 5/2017 | Pandya | |
| 9,767,028 B2 | 9/2017 | Cheng et al. | |
| 9,793,919 B1 | 10/2017 | Donley et al. | |
| 10,042,576 B2 | 8/2018 | Kalyanasundharam et al. | |
| 10,079,916 B2 | 9/2018 | Roberts et al. | |
| 10,320,695 B2 | 6/2019 | Reinhardt et al. | |
| 2002/0172199 A1 | 11/2002 | Scott et al. | |
| 2003/0041138 A1 | 2/2003 | Kampe et al. | |
| 2004/0054953 A1* | 3/2004 | Mitchell | G06F 12/0875 |
| | | | 714/748 |
| 2004/0227765 A1* | 11/2004 | Emberling | G06T 1/60 |
| | | | 345/582 |
| 2007/0106874 A1 | 5/2007 | Pan et al. | |
| 2007/0288721 A1 | 12/2007 | Kruger et al. | |
| 2008/0028403 A1 | 1/2008 | Hoover et al. | |
| 2010/0142560 A1* | 6/2010 | Sharivker | H04L 69/04 |
| | | | 370/477 |
| 2011/0055838 A1 | 3/2011 | Moyes | |
| 2012/0290756 A1 | 11/2012 | Damodaran et al. | |
| 2013/0166874 A1 | 6/2013 | Auernhammer et al. | |
| 2014/0013079 A1 | 1/2014 | Watson, Jr. et al. | |
| 2014/0119377 A1* | 5/2014 | Crosta | H04L 45/7453 |
| | | | 370/392 |
| 2014/0122560 A1 | 5/2014 | Ramey et al. | |
| 2014/0244935 A1* | 8/2014 | Ezra | G06F 3/065 |
| | | | 711/133 |
| 2014/0254591 A1 | 9/2014 | Mahadevan et al. | |
| 2015/0016320 A1* | 1/2015 | Pelletier | H04W 28/06 |
| | | | 370/310 |
| 2016/0196211 A1* | 7/2016 | Kajimoto | G06F 12/121 |
| | | | 711/128 |
| 2017/0279934 A1* | 9/2017 | Zacharias | H04L 69/04 |
| 2018/0349284 A1* | 12/2018 | Lai | G06F 12/0895 |
| 2019/0205244 A1* | 7/2019 | Smith | G06F 3/0613 |

OTHER PUBLICATIONS

International Search Report and Written Opinion in International Application No. PCT/US2019/039919, dated Oct. 17, 2019, 14 pages.

First Examination Report in Indian Patent Application No. 202117013377, dated Feb. 4, 2022, 6 pages.

\* cited by examiner

METHOD FOR MAINTAINING CACHE CONSISTENCY DURING REORDERING

BACKGROUND

Description of the Related Art

In computing systems, some types of applications perform functions that are better able to exploit parallel processing and shared memory than other applications. Examples of such applications include machine learning applications, entertainment and real-time applications, as well as some business, scientific, medical and other applications. While some processor architectures include more than one processing unit (e.g., CPU, GPU, etc.) or processing core, in some cases additional processing units coupled to a memory does not provide a desired level of performance.

Generally speaking, computing systems transfer communication messages through a communication fabric (or "fabric"). Examples of communication messages include coherency probes, interrupts, and read and write access commands and corresponding data. Examples of interconnections in the fabric are bus architectures, crossbar-based architectures, network-on-chip (NoC) communication subsystems, communication channels between dies, silicon interposers, and through silicon vias (TSVs). In many cases, the fabric has multiple physical channels, each supporting relatively wide packets. While transferring data within a single fabric, a high number of available physical wires may be used to reduce latency through the fabric. In this manner, the bandwidth through the fabric may be relatively large on the whole. However, when connecting separate dies together via the fabric, a lower number of available physical wires on the separate dies are typically used to transfer the data. Similarly, when connecting separate processing nodes together, each with a respective fabric, a lower number of available physical wires between the processing nodes limits the bandwidth. Consequently, data transfer efficiency is often reduced at the boundaries of the fabric in such computing systems.

In view of the above, efficient methods and systems for performing efficient data transfer in a computing system are desired.

BRIEF DESCRIPTION OF THE DRAWINGS

The advantages of the methods and mechanisms described herein may be better understood by referring to the following description in conjunction with the accompanying drawings, in which.

Figure 1:
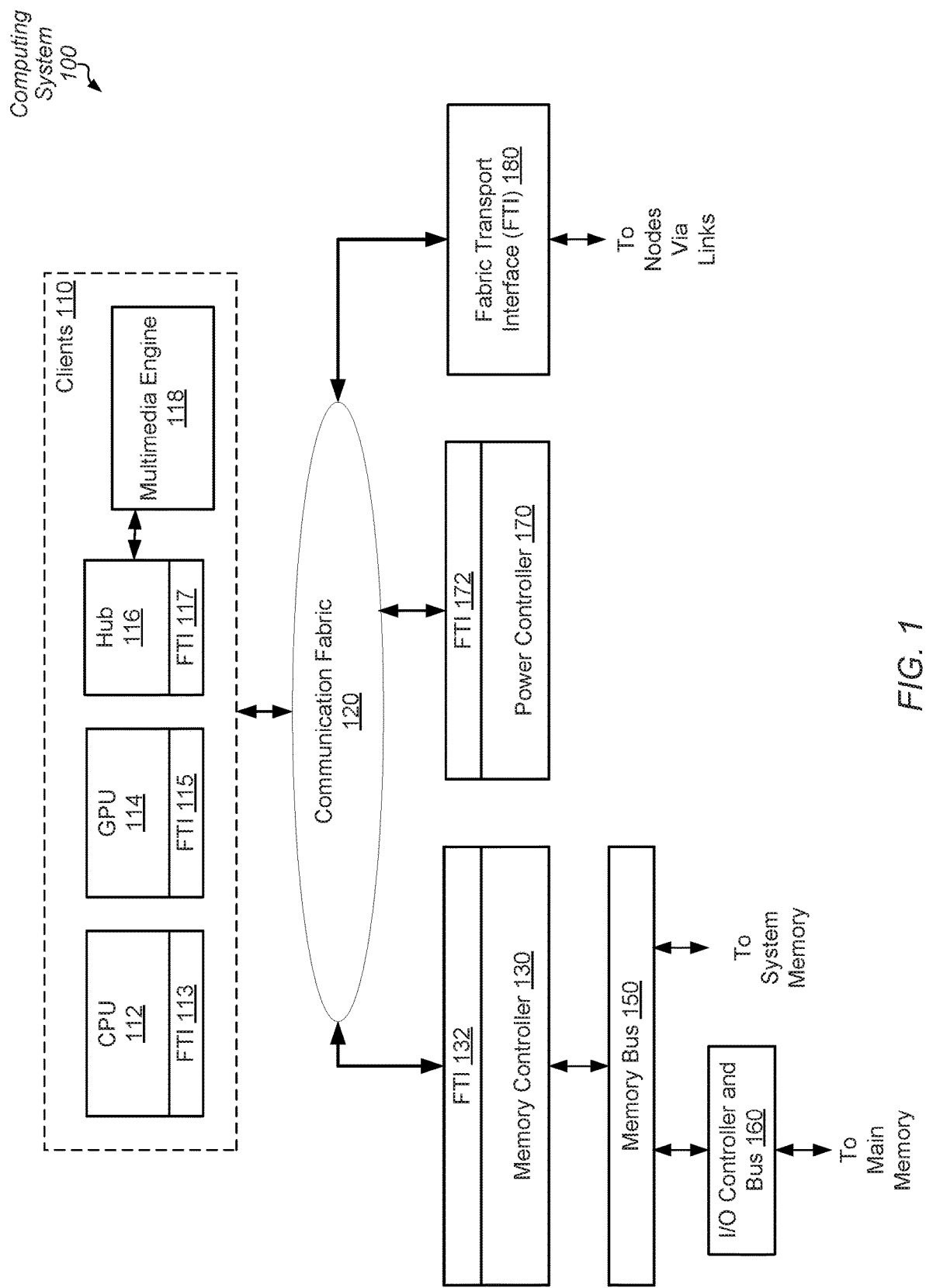
FIG. 1 is a block diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient data transfer in a computing system are disclosed. One or more clients in the computing system process applications. Examples of such clients include a general-purpose central processing unit (CPU), a graphics processing unit (GPU), an accelerated processing unit (APU), an input/output (I/O) device, and so forth. The computing system also includes at least a power controller, and multiple link interfaces for transferring data between clients. In addition, each of the one or more clients and a communication fabric between the clients include fabric interfaces with a packet transmitter and a packet receiver. In various embodiments, the packet transmitter includes multiple request queues for storing requests of different packet types. Each one of the multiple request queues in the packet transmitter stores requests of a respective packet type. Examples of packet types include a request type, a response type, a probe type, a control type, and a token or credit type. In various embodiments, the packet transmitter divides a write request into a write command and write data. The packet transmitter inserts the write command in a command or control packet and inserts the write data in a separate write data packet that corresponds to the write command. In a similar manner, the packet transmitter divides a read response into a read message and read response data. The packet transmitter inserts the read message in a command or control packet, and inserts the read response data in a separate data packet. For read requests that do not include response data, the packet transmitter does not perform the dividing steps. Rather, the packet transmitter inserts a read request as a read command in a command or control packet.

In some cases, two or more of the multiple request queues store packets of different sizes in the packet transmitter. In addition, the packet transmitters and the packet receivers include one or more address history caches corresponding to the one or more request queues. An address history cache stores at least a portion of a request address. Since streams of requests from different physical devices can have address locality, the address history cache stores the upper portion of the address on both sides of the link. Address locality is also referred to as "spatial locality" and refers to multiple memory access requests that are relatively close to one another. For example, in some cases the request addresses are contiguous (e.g., each of the contiguous memory access requests accesses a cache line, byte, etc., neighboring an immediately previous accessed cache line). In other examples, the access pattern has a particular constant offset such that the requests addresses are incremented by a fixed amount between each memory access request. In yet other examples, each the request addresses has an increasing offset compared to an immediately previous request address.

The packet transmitter determines when to store a particular address in its local address history cache. The packet transmitter also stores an indication (or "identifier") in the associated request packet that identifies a storage location where the packet receiver is store at least a portion of the particular address. In some embodiments, for subsequent requests in the same address range as the particular address, the packet transmitter sends packets without at least a portion of the addresses corresponding to these subsequent requests. Rather than include the omitted portion of the address, the packet transmitter sends the identifier of the storage location. Refraining from including portions of the addresses in the packets reduces the amount of data in the packets. Accordingly, the packets are compressed in size compared to packets that store entire request addresses. In some embodiments, each of the packet transmitter and the packet receiver uses the same identification of the storage location for their respective address history caches. The packet receiver uses the received identification of the storage location to determine the entire request address, and uses the request address to service the received request.

The packet transmitter also includes multiple queue arbiters, each for selecting a candidate packet from a respective one of the multiple request queues. Further, the packet transmitter includes a buffer for storing a link packet. The link packet includes data storage space for storing multiple candidate packets. When candidate packets are compressed packets due to the use of an identification of storage locations in the address history caches instead of using the entire request addresses, the link packet is capable of storing more candidate packets. Accordingly, more candidate packets can be conveyed at a time and the usage of the links becomes more efficient.

Each of the above mentioned queue arbiters selects requests from a corresponding request queue and the packing arbiter selects and inserts candidate packets into the link buffer based on one or more attributes. Examples of such attributes include age, a priority level of the packet type, a quality-of-service parameter, a source identifier, an application identifier or type (e.g., such as a real-time application), an indication of traffic type (e.g., such as real-time traffic), a bandwidth requirement or a latency tolerance requirement, a virtual channel identifier, and so forth. In some cases, the queue arbiter selects requests for out-of-order issue from the request queue.

In various embodiments, the arbitration logic updates fields stored in the entries of the request queues as the logic deallocates, or otherwise invalidates, the entries out-of-order. In one example, the arbitration logic selects a younger second request ahead of an older first request in a particular request queue. The request queue entry for the older first request stores an indication for storing a portion of the address at the receiver. The younger second request depends on at least the portion of the address to be stored at the receiver by the first request. When the second request bypasses the first request during out-of-order issue, and at least the portion of the address is unavailable at the receiver, data corruption occurs. In various embodiments, the arbitration logic determines when this case occurs and changes the younger second request from a compressed format to an uncompressed format. The compressed format stores the identification of a storage location in the address history cache, which in turn stores the portion of the address, whereas, the uncompressed format stores the portion of the address. Therefore, the arbitration logic detects when out-of-order conflicts exist during issue and adjusts the outbound packets to avoid data corruption.

Referring to FIG. 1, a generalized block diagram of one embodiment of a computing system 100 is shown. As shown, the computing system 100 includes a communication fabric 120 between each of clients 110, a memory controller 130, a power controller 170 and link interfaces 180. In some embodiments, the components of the computing system 100 are individual dies on an integrated circuit (IC), such as a system-on-a-chip (SOC). In other embodiments, the components are individual dies in a system-in-package (SiP) or a multi-chip module (MCM). As shown, the clients 110 include a central processing unit (CPU) 112, a graphics processing unit (GPU) 114, Hub 116 and Multimedia Engine 118. The CPU 112, GPU 114 and Multimedia Engine 118 are examples of computing resources that are capable of processing applications. Although not shown, in other embodiments, other types of computing resources are included in the clients 110.

Generally speaking, the CPU 112 includes one or more processor cores for executing instructions according to a given instruction set architecture (ISA). One or more of the processor cores uses a superscalar and multi-threaded microarchitecture for processing instructions. The GPU 114 uses a parallel data microarchitecture (e.g., single-instruction-multiple-data or "SIMD") that includes multiple parallel execution lanes. The Multimedia Engine 118 includes processors for processing audio data and video data for multimedia applications. The Hub 116 includes interface logic for communication between the Multimedia Engine 118 and external components such as video ports, audio ports, and so forth. In addition, the Hub 116 includes interface logic for communication between Multimedia Engine 118 and the multiple local computing resources in the computing system 100.

Power controller 170 collects data from clients 110 such as predetermined sampled signals during given sample intervals. On-die current sensors and temperature sensors (not shown) also send information to the power controller 170. The power controller 170 selects a respective power-performance state (P-state) for at least one or more of the computing resources in the clients 110 and the memory controller 130. The P-state includes at least an operating voltage and an operating clock frequency.

Although a single memory controller 130 is shown, in other embodiments, the computing system 100 uses another number of memory controllers. Memory controller 130 receives memory requests from the clients 110 via the fabric 120, schedules the memory requests, and sends the scheduled memory requests to one or more of system memory and main memory. Memory controller 130 also receives responses from system memory and main memory and sends the responses to a corresponding source of the request in clients 110. The main memory fills the system memory with data through the I/O controller and bus 160 and the memory bus 150. The main memory sends a cache fill line with a requested block to a corresponding one of the cache memory subsystems in clients 110 in order to complete an original memory request. The corresponding one of the cache memory subsystems in clients 110 places the cache fill line in one or more levels of caches.

The address space of the computing system 100 is divided among at least the CPU 112, the GPU 114 and the Multimedia Engine 118 and one or more other components such as input/output (I/O) peripheral devices (not shown) and other types of computing resources. Memory maps are maintained for determining which addresses are mapped to which component, and hence to which one of the CPU 112, the GPU 114 and the Multimedia Engine 118 a memory request for a particular address should be routed. The system memory is one of a variety of dynamic random access memory (DRAM) and the memory controller 130 supports a corresponding protocol. The protocol determines values used for information transfer, such as a number of data transfers per clock cycle, signal voltage levels, signal timings, signal and clock phases and clock frequencies. The main memory is one of a variety of types of non-volatile, random access secondary storage of data. Examples of main memory are hard disk drives (HDDs) and solid-state disks (SSDs).

Communication fabric 120 (or the fabric 120) transfers traffic back and forth between the clients 110 and the memory controller 130 and includes interfaces for supporting respective communication protocols. The "traffic" includes data such as commands, messages, probes, interrupts, and data corresponding to the commands and messages. The fabric 120 includes queues for storing requests and responses. The fabric 120 also includes selection logic for arbitrating between received requests before sending requests across an internal network. Additional logic in the fabric 120 builds and decodes packets as well as selects routes for the packets.

Fabric transport interface (FTI) 180 supports communication between the computing system 100 and other computing systems or processing nodes by transferring traffic on links. The traffic sent across the links includes an indication of an operating state for one or more processing nodes, a power down request, responses to requests, interrupts, and other information. As shown, clients 110 includes FTI 113 for CPU 112, FTI 115 for GPU 114 and FTI 117 for Hub 116. Additionally, the memory controller 130 includes FTI 132, whereas the power controller 170 includes FTI 172. Each of the fabric transport interfaces 113, 115, 117, 132, 172, and 180 includes a packet transmitter and a packet receiver. Fabric 120 includes multiple fabric transport interfaces, which are not shown for ease of illustration. In some embodiments, each link connected to a fabric transport interface is a point-to-point communication channel. In other embodiments, one or more links connected to a fabric transport interface is an end-to-end communication channel.

The fabric transport interfaces include control logic and buffers or queues for communication. At the physical level, a link includes one or more lanes. The fabric transport interfaces and the corresponding links include communication protocol connections such as PCIe (Peripheral Component Interconnect Express), InfiniBand, RapidIO, HyperTransport, Advanced eXtensible Interface (AXI), and so forth. Each of the fabric transport interfaces 113, 115, 117, 132, 172, and 180 includes multiple request queues, each for storing requests of a respective type. Additionally, each of the fabric transport interfaces 113, 115, 117, 132, 172, and 180 includes one or more address history caches corresponding to one or more request queues. An address history cache stores at least a portion of a request address. Since streams of requests from different physical devices have address locality, the address history cache stores the upper portion of the request address on both sides of the link.

Each of the fabric transport interfaces 113, 115, 117, 132, 172, and 180 includes control logic for various purposes. For example, when receiving requests and allocating entries in the request queues, control logic accesses the address history caches to determine whether the address history caches already store portions of the request addresses. During allocation of the entries in the request queues, the control logic updates fields in the queue entries to indicate whether outbound packets use an identification of a storage location in an address history cache or use the request address. Additionally, the control logic includes multiple queue arbiters, each for selecting a request from a respective one of the multiple request queues. The queue arbiters select requests from the request queues for out-of-order issue. The queue arbiters determine when out-of-order conflicts exist and adjust both the outbound packets and the fields stored in the queue entries to avoid data corruption.

In one example, a queue arbiter bypasses an older first request in a request queue by selecting a younger second request for issue. A queue entry for the first request stores an indication to store a portion of the request address at the receiver. Therefore, this portion of the request address is not yet stored at the receiver. A queue entry for the second request stores an indication to retrieve the portion of the request address from a remote address history cache at the receiver. This queue entry for the second request also stores identification of a storage location in the remote address history cache at the receiver. The queue arbiter determines when this case occurs and changes the younger second request from a compressed format using the identification of the storage location to an uncompressed format using the portion of the request address. By changing the second request from the expected compressed format to an uncompressed format, the queue arbiter in the transmitter avoids data corruption at the receiver.

One or more of the fabric transport interfaces 113, 115, 117, 132, 172 and 180 in the computing system 100 also include a buffer for storing a link packet, which includes data storage space for storing multiple candidate packets. In some embodiments, two or more of the multiple request queues store candidate packets of different sizes. A packing arbiter in the fabric transport interface selects qualified candidate packets from the multiple request queues and inserts these candidate packets into the link packet. When candidate packets are compressed packets storing identification of a storage location in the remote address history cache at the receiver, the packing arbiter is able to insert more candidate packets into the link packet. The packing arbiter also determines whether the link packet has remaining available data storage space aligned on a given boundary for a given candidate packet. A packet receiver in the fabric transport interface includes a receiving queue for receiving the link packet sent by the packet transmitter.

Figure 2:
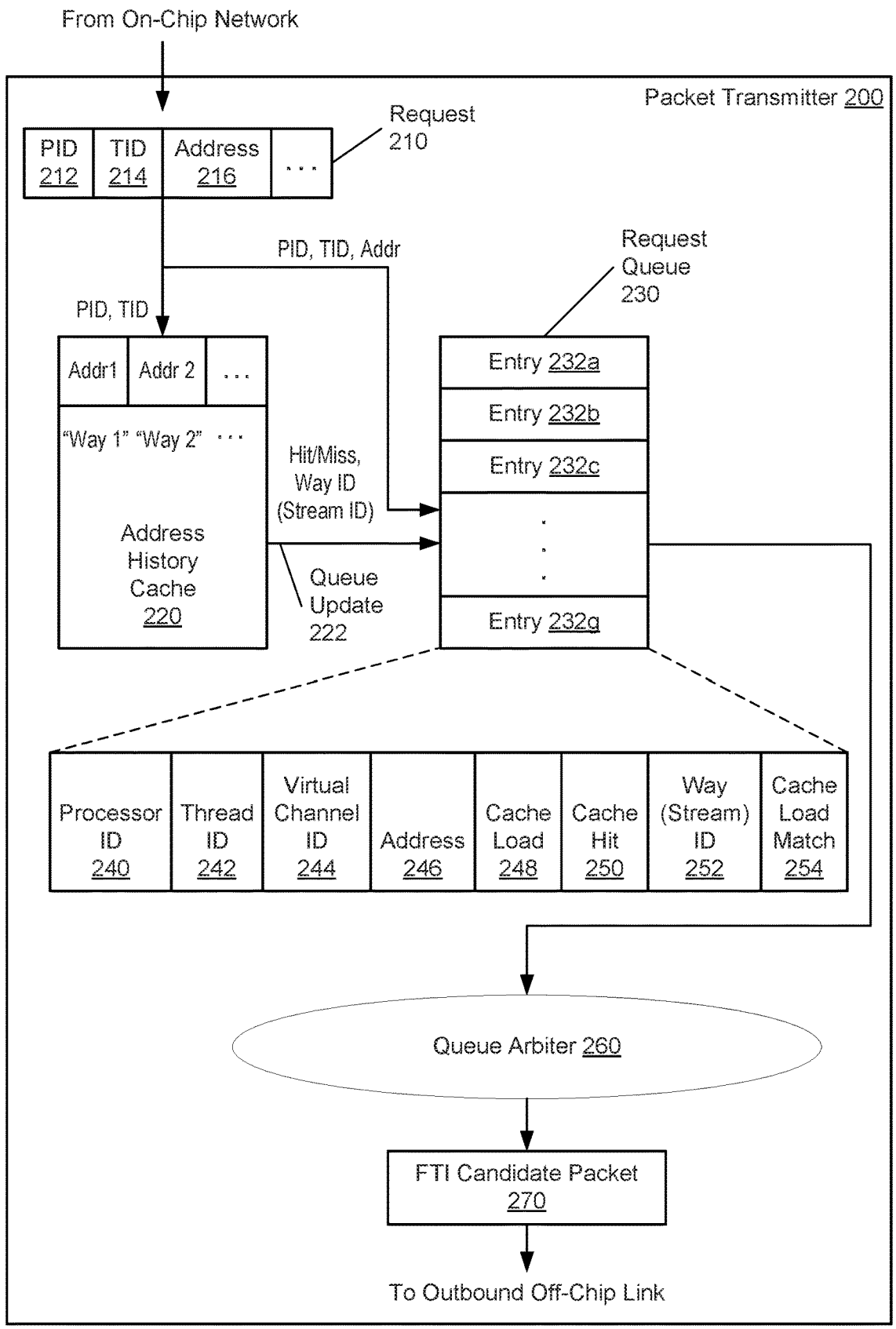
FIG. 2 is a block diagram of one embodiment of a packet transmitter.

Referring to FIG. 2, a generalized block diagram of one embodiment of a packet transmitter 200 is shown. The packet transmitter 200 includes the request queue 230 and the corresponding address history cache 220. Although the packet transmitter 200 includes a single request queue and a single corresponding address history cache, in other embodiments, the packet transmitter 200 uses another number of these components. The packet transmitter 200 receives a request 210 from an on-chip network or fabric to send to an outbound off-chip link. The request 210 includes at least a source identifier (ID) and an address 216. As shown, the source identifier includes a processor identifier (PID) 212 and a thread identifier (TID) 214. In other embodiments, the source identifier additionally includes one or more of a process ID and an application ID. Other information (not shown) in the request 210 includes a request type for indicating the request 210 is a read operation or a write operation.

Control logic, which is not shown for ease of illustration, indexes into the address history cache 220 with the source identifier. In some designs, the address history cache 220 is a direct-mapped cache. In other designs, the address history cache 220 has any set associativity. When used as an index, the source identifier identifies a particular set in the address history cache 220. The control logic uses a portion of the address 216 as a tag for determining whether any one of the ways in the identified set generates a cache hit. Since streams of requests from different physical devices have address locality, the address history cache 220 stores a portion of the address 216 for the requests. In one example, the address history cache 220 stores the upper portion of the address 216. Therefore, as used herein, the "way" of the address history cache 220 is also referred to as the "stream." If the lookup of the address history cache 220 generates a cache hit, then control logic for the address history cache 220 sends the way identifier (ID) of the particular way that generated the hit to control logic for the request queue 230. In the illustrated embodiment, the queue update 222 sent from the address history cache 220 to the request queue 230 includes at least the way ID.

If the lookup of the address history cache 220 generates a cache miss, then the control logic for the address history cache 220 selects a particular way within the set. In some cases, the control logic uses a least recently used (LRU) scheme to select the particular way within the set. In other cases, the control logic uses any one of a variety of other schemes to select the particular way within the set. Afterward, the control logic stores at least a portion, such as the upper portion, of the address 216 in the particular way within the selected set of the address history cache 220. As shown, the queue update 222 sent from the address history cache 220 to the request queue 230 includes at least an indication of a cache hit/miss result. As shown, the queue update 222 also includes the way ID that currently stores at least a portion of the address 216.

The request queue 230 includes multiple entries 232a-232g for storing information. In various embodiments, each of the entries 232a-232g stores at least fields 240-254. Fields 240 and 242 store the source identifier information such as the processor ID and the thread ID. In other embodiments, the source identifier additionally includes other information such as a process ID and an application ID. As shown, field 244 stores a virtual channel ID. Request streams from multiple different physical devices flow through virtualized channels (VCs) over a same physical link. Arbitration logic uses at least priority levels of virtual channels and the stored virtual channel IDs in the entries 232a-232g when selecting requests for issue.

Field 246 stores at least a portion of the address 216. Field 248 stores an indication of a cache load. For example, if the lookup into the address history cache 220 resulted in a cache miss and at least a portion of the received address 216 is stored, or loaded, in the address history cache 220, then field 248 stores an asserted value. In one example, the asserted value is a binary '1,' which is used to indicate that a cache load occurred for the received request 210. In another example, the binary value '0' is used to indicate an asserted value. Field 250 stores an indication specifying that an earlier search of the address history cache 220 found an address that corresponds to the received request 210. In other words, cache hit field 250 stores an indication of whether a cache hit occurred during the earlier lookup of the address history cache 220 for the received request 210. If the lookup into the address history cache 220 resulted in a cache hit, then field 250 stores an asserted value.

Field 252 stores an indication of the way in the address history cache 220 within a selected set that currently stores at least a portion of the received address 216. If a cache hit occurred, then the particular way identified by field 252 already stored at least a portion of the received address 216. However, if a cache miss occurred, then a replacement scheme selected the particular way identified by field 252, and this particular way had at least a portion of the received address 216 loaded into it after the cache miss. Other fields included in entries 232a-232g, but not shown, include a status field indicating whether an entry stores information of an allocated entry. Such an indication includes a valid bit. Another field stores an indication of the request type. In some embodiments, an additional field stores an age when entry position does not indicate age.

In some embodiments, when the queue arbiter 260 selects an entry, which stores an asserted value in field 250, the packet transmitter 200 sends the FTI candidate packet 270 as a compressed packet. For example, the packet transmitter 200 sends the source identifier and the way ID in the outbound compressed packet instead of the entire request address. At the receiver, control logic uses the source identifier and the way ID, such as fields 240-242 and field 252, to access an address history cache at the receiver. Similar to the local address history cache 220 in the packet transmitter 200, this remote address history cache at the receiver stores at least a portion of the request address. Therefore, the packet transmitter 200 does not transport at least a portion of the request address across the link to the receiver when sending an outbound compressed packet across the link.

In some embodiments, control logic allocates entries 232a-232g in the request queue 230 in an in-order manner, so the entry positions of entries 232a-232g indicate age. If control logic allocates entries 232a-232g in the request queue 230 in an out-of-order manner, then the entries 232a-232g store an additional age field. In various embodiments, control logic deallocates the entries 232a-232g in the request queue 230 in an out-of-order manner. As described earlier, request streams from multiple different physical devices flow through virtualized channels (VCs) over a same physical link. Sometimes clients send requests from different VCs over the outbound link in a different order than an order that the packet transmitter 200 received them. For example, queue arbiter 260 selects one of entries 232a-232g to use for creating FTI candidate packet 270 based on one or more attributes. Examples of the one or more attributes are a priority level of the request type, a quality-of-service parameter, a source identifier, an application identifier or type, such as a real-time application, an indication of traffic type, such as real-time traffic, a bandwidth requirement or a latency tolerance requirement, a virtual channel identifier, and so forth. The different order avoids system level deadlocks.

Field 254 stores an indication of a cache load match. A cache load match for a second request indicates a first request, which is older than the second request, in the request queue 230 from a same source that stores an asserted value for the cache load field 248. Therefore, this older first request should have at least a portion of its address loaded into a remote address history cache at the receiver. In other words, the cache load match field 254 specifies whether the request queue 230 has a valid second entry for the first request that is going to store at the receiver the address that corresponds to the younger second request. Each of the first request and the second request is from a same source. In other words, entries in the request queue 230 for each of the first request and the second request store the same values in the fields 240, 242 and 252. The cache load match field 254 stores an asserted value when control logic determines the first request is a youngest request of requests older than the second request stored in the request queue 230 with an indication specifying an address is to be stored at the receiver. Accordingly, the second request is dependent on the older first request, since the older first request should store at least a portion of the request address at the receiver. When at least a portion of the request address is stored at the receiver, control logic sends the younger second request as a compressed packet.

Queue arbiter 260 or other control logic updates one or more of fields 240-254 stored in the entries 232*a*-232*g* of the request queue 230 as the queue arbiter 260 deallocates entries out-of-order. In one example, the queue arbiter 260 selects the younger second request for deallocation, which bypasses the older first request in the request queue 230. The entry in the request queue 230 storing the older first request includes an indication to store a portion of the address at the receiver. The younger second request depends on the portion of the address to be already stored at the receiver. The queue arbiter 260 determines when this case occurs and changes the younger second request from a compressed format to an uncompressed format. The compressed format stores the identification of a storage location such as at least values stored in fields 240, 242 and 252. The uncompressed format stores the portion of the address such as the value stored in field 246. By detecting the above case caused by out-of-order issue from the request queue 230, the queue arbiter 260 avoids data corruption from occurring at the receiver.

Figure 3:
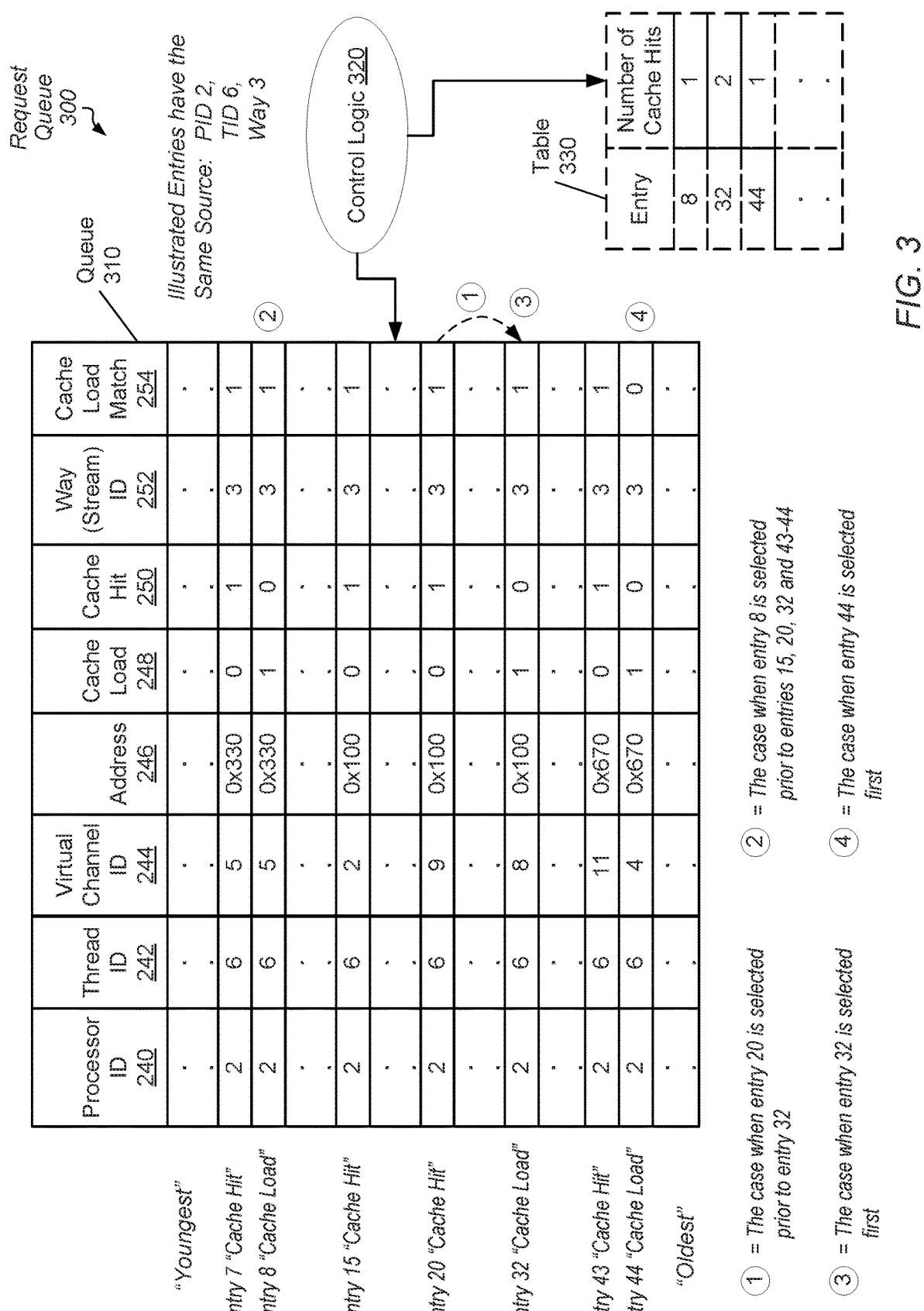
FIG. 3 is a block diagram of one embodiment of a request queue.

Referring to FIG. 3, a generalized block diagram of one embodiment of a request queue 300 is shown. Circuitry and logic previously described are numbered identically. As shown, request queue 300 includes queue 310 and control logic 320. The request queue 310 stores information in entries with at least the fields 240-254. The entries of queue 310 store other fields, which are not shown, such as a status field. The status field stores an indication of whether an entry is allocated. Such an indication includes a valid bit, in one example. Another field stores an indication of the request type. In some embodiments, the request queue 300 also includes table 330, which tracks a particular entry with a cache load field 248 storing an asserted value and a corresponding number of allocated entries in queue 310 with the cache hit field 250 storing an asserted value, which are dependent on the particular entry. For example, the first entry in table 330 stores an indication of entry 8. Entry 8 of queue 310 stores an asserted value in the cache load field 248. In addition, this first entry of table 330 stores a count of one for a number of allocated entries in queue 310 with an asserted cache hit field 250 corresponding to entry 8. Here, the count of one refers to entry 7.

When the control logic 320 does not use entry position to indicate age, an additional field (not shown) in entries of queue 310 stores an age. As shown, the control logic 320 allocates the queue 310 in an in-order manner by age and stores the younger requests toward the top of the queue 310, whereas the control logic 320 stores the older requests toward the bottom of the queue 310. In other embodiments, the control logic 320 uses a reverse age order for storing requests in the queue 310. Each of entries 7-8, 15, 20, 32 and 43-44 of queue 310 stores information from a same source such as a processor with ID 2, a thread with ID 6 and a Way with ID 3. A request stored in entry 44 is the oldest request of this group, whereas, the request stored in entry 7 is the youngest request of this group.

Requests allocated in entries 8, 32 and 44 store asserted values in the cache load field 248. As described earlier, in some cases, a binary value '1' indicates an asserted value. Therefore, the requests corresponding to entries 8, 32 and 44 generated cache misses during a lookup of a local address history cache at the transmitter, and their respective addresses or portions of their addresses were loaded into the local address history cache at the transmitter. The request allocated in entry 44 had its request address 0x670 loaded into the local address history cache at the transmitter due to a cache miss. Here, the indication "0x" refers to a hexadecimal numerical format. The request allocated in entry 32 had its request address 0x100 loaded into the local address history cache at the transmitter due to a cache miss. The request allocated in entry 8 had its request address 0x330 loaded into the local address history cache at the transmitter due to a cache miss.

Each of the requests allocated in entries 7, 15, 20 and 43 stores an asserted value in the cache hit field 250. Therefore, the corresponding requests generated cache hits during a lookup of the local address history cache at the transmitter. If external issue logic does not insert their respective addresses or portions of their addresses in corresponding packets, then these packets are compressed packets and improve the efficiency of the link. For compressed packets, the receiver uses the fields 240-242 and 252 to access a remote address history cache at the receiver to retrieve the request address, which was previously stored at the receiver.

As shown, only the request allocated in entry 44 stores a cleared (negated) value in the field 254 (the cache load match field). As described earlier, a cache load match for a second request indicates an older first request in the queue 310 from a same source stores an asserted value for the cache load field 248. Therefore, soon after the control logic 320 sent this older first request to the receiver, this older first request should have at least a portion of its address loaded into each of a local address history cache at the transmitter and a remote address history cache at the receiver. In the illustrated example, only the request allocated in entry 44 does not have an older request from the same source that also had its request address stored in at least the local address history cache at the transmitter.

As described earlier, in some embodiments, the control logic 320 deallocates entries in queue 310 in an out-of-order manner. In some cases, the control logic 320 selects entries in queue 310 for deallocation in an out-of-order manner, but the actual deallocation occurs at a later point in time. The arbitration logic is included in the control logic 320 in some designs, but located separately from the control logic 320 in other designs. Below queue 310, four cases are shown of deallocating (invalidating) entries in queue 310 when issuing requests.

Case 1: Entry 20 is Selected for Issue Prior to Entry 32

For case 1, the control logic 320 selects the younger request allocated in entry 20 for deallocation ahead of the older request allocated in entry 32. In such a case, the control logic 320 sends the resulting packet for the younger request allocated in entry 20 as an uncompressed packet, rather than an expected compressed packet. The control logic 320 sends the request address in the address field 246 (e.g., 0x100) in the uncompressed packet, since the receiver does not yet have the request address from the older request allocated in entry 32.

In the illustrated embodiment, the asserted value in the cache load match field 254 indicates that the control logic 320 should convert the selected younger request allocated in entry 20 from an expected compressed packet to an uncompressed packet. In a similar manner for requests allocated in entries 20 and 32, the requests allocated in entries 15 and 32 have case 1 occur for them too such as when the control logic 320 selects entry 15 for issue prior to entry 32. Similarly, the case 1 also occurs for the requests allocated in entries 7-8 such as when the control logic 320 selects entry 7 for issue prior to entry 8. Likewise, the case 1 also occurs for the requests allocated in entries 7-8 and 43-44 such as when the control logic 320 selects entry 43 for issue prior to entry 44. In other cases, the control logic 320 selects the younger request allocated in entry 20 after the older request allocated in entry 32. In these cases, a cleared or negated value in the field 254 indicates that the selected younger request allocated in entry 20 remains as an expected compressed packet.

Case 2: Entry 8 is Selected for Issue Prior to Entries 15, 20, 32 and 43-44

For case 2, the control logic 320 selects the younger request allocated in entry 8 for deallocation ahead of one or more of the older requests allocated in entries 15, 20, 32 and 43-44. In such a case, the control logic 320 sends the packet generated for the younger request allocated in entry 8 as an expected uncompressed packet. As described earlier, the request allocated in entry 8 stores an asserted value in the cache load field 248. Therefore, the request generated a cache miss during a lookup of the local address history cache at the transmitter, and its respective address or portion of its address was loaded into the local address history cache. Although the control logic 320 created an expected uncompressed packet for the selected request allocated in entry 8, the control logic 320 performs an update for the one or more still-allocated older requests allocated in entries 15, 20, 32 and 43-44. The control logic 320 cannot send packets generated for these older requests as compressed packets due to the out-of-order issue and the storage of address 0x330 at the receiver in place of the storage of the address 0x100 used by the requests allocated in entries 15 and 20 and the address 0x670 used by the request allocated in entry 43. Therefore, to perform the updates, the control logic 320 searches for all older requests from the same source as the request allocated in entry 8 and updates particular fields for any found requests from this search.

As described earlier, the control logic 320 identifies the source with the fields 240-242 and 252 (e.g., PID 2, TID 6, and Way 3). The entries storing requests from the same source as the request allocated in entry 8 include the older requests allocated in entries 15, 20, 32 and 43-44. For the identified entries 15, 20, 32 and 43-44, the control logic 320 clears each of the Cache Load field 248 and the Cache Hit field 250. Therefore, the receiver does not use its remote address history cache for the corresponding received packets for requests allocated in entries 15, 20, 32 and 43-44.

In addition to updating older requests stored in the request queue 300 as described above, the control logic 320 also updates any requests younger than the request allocated in entry 8 when the cache load field 248 stores an asserted value in entry 8. In the illustrated example, control logic 320 searches younger entries in queue 310 from a same source with an asserted value stored in the cache load field 248. No such entries exist. Therefore, the control logic 320 performs the search between entry 8 and entry 1 from oldest to youngest by age to identify entries allocated for requests from a same source. In this particular case, the search finds entry 7, which stores an asserted value in the cache hit field 250. The control logic 320 clears the cache load match field 254 for entry 7. Therefore, at a later point in time when the control logic 320 selects the request allocated in entry 7, the control logic 320 creates a compressed packet. The control logic 320 creates a compressed packet, since the request address or a portion of the request address is stored in the remote address history cache at the receiver due to the control logic 320 having already issued the older entry 8.

Case 3: Entry 32 is Selected for Issue First

For case 3, the control logic 320 selects the younger request allocated in entry 32 for deallocation ahead of one or more of the older requests allocated in entries 43-44 and ahead of one or more of the younger requests allocated in entries 7-8, 15 and 20. Case 3 is similar to case 2, but there are multiple younger requests from the same source and there is a younger request with an asserted value stored in the cache load field 248. For case 3, the control logic 320 sends the packet generated for the request allocated in entry 32 as an expected uncompressed packet. As described earlier, the request allocated in entry 32 stores an asserted value in the cache load field 248. Therefore, the request generated a cache miss during a lookup of the local address history cache at the transmitter, and its respective address or portion of its address was loaded into the local address history cache.

Although the control logic 320 created an expected uncompressed packet for the selected request allocated in entry 32, the control logic 320 performs an update for the one or more still-allocated older requests allocated in entries 43-44 as well as for one or more still-allocated younger requests allocated in entries 7-8, 15 and 20. The control logic 320 cannot send a packet generated for the older request allocated in entry 43 as a compressed packet. As shown, the older request allocated in entry 43 stores an asserted value in the cache hit field 250. The out-of-order issue and the storage of the address 0x100 at the receiver in place of the address 0x670 used by the request allocated in entry 43 would cause data corruption if the control logic 320 sent the packet as a compressed packet. To avoid data corruption, the control logic 320 searches for any older requests in queue 310 from the same source as the request allocated in entry 32. The entries storing older requests from the same source as the request allocated in entry 32 include the requests allocated in entries 43-44. For the older requests in the identified entries 43-44, the control logic 320 clears each of the Cache Load field 248 and the Cache Hit field 250. Therefore, the receiver does not use its remote address history cache for the corresponding received packets for requests allocated in entries 43-44.

In addition to updating older requests stored in the queue 310 as described above, the control logic 320 also updates any requests younger than the request allocated in entry 32 when the cache load field 248 stores an asserted value. In the illustrated example, the control logic 320 searches younger entries from a same source with an asserted value stored in the cache load field 248. The control logic 320 finds entry 8. Therefore, the control logic 320 performs a search between entry 8 and entry 32 from oldest to youngest by age to identify entries allocated for requests from a same source. In this particular case, the control logic 320 finds entries 15 and 20, and each of entries 15 and 20 has an asserted value stored in the cache hit field 250. The control logic 320 clears the field 254 for entries 15 and 20. Therefore, at a later point in time when the control logic 320 selects the requests allocated in entries 15 and 20, the control logic 320 creates compressed packets. The control logic 320 creates a compressed packet, since the request address or a portion of the request address is stored in the remote address history cache at the receiver due to the control logic 320 having already issued the older entry 32.

Case 4: Entry 44 is Selected for Issue First

For case 4, the control logic 320 selects the request allocated in entry 44 for deallocation ahead of one or more of the requests allocated in entries 7-8, 15, 20 and 43. For case 4, the control logic 320 sends the packet generated for the request allocated in entry 44 as an expected uncompressed packet. As described earlier, the request allocated in entry 44 stores an asserted value in the cache load field 248. Therefore, the request generated a cache miss during a lookup of the local address history cache at the transmitter, and its respective address or portion of its address was loaded into the local address history cache. Control logic 320 for the request queue 300 searches for any older requests from the same source as the request allocated in entry 44. As shown, for case 4, there are no older requests from the same source allocated in the queue 310. Therefore, the control logic 320 performs no updates to clear the cache load field 248 and the cache hit field 250 of older requests.

In addition to searching for older requests for potentially updating their fields stored in the queue 310, the control logic 320 also searches for any requests younger than the request allocated in entry 44 when the cache load field 248 stores an asserted value. In the illustrated example, control logic 320 for request queue 300 searches younger entries from a same source with an asserted value stored in the cache load field 248. The control logic 320 finds entry 32. Therefore, the control logic 320 performs a search between entry 32 and entry 44 from oldest to youngest by age to identify entries allocated for requests from a same source. In this particular case, the control logic 320 finds entry 43, which has an asserted value stored in the cache hit field 250. The control logic 320 clears the cache load match field 254 for entry 43. Therefore, at a later point in time when the control logic 320 selects the request allocated in entry 43, the control logic 320 creates a compressed packet. The control logic 320 creates a compressed packet, since the request address or a portion of the request address is stored in the remote address history cache at the receiver due to the control logic 320 having already issued the older entry 44.

Tracking a Number of Cache Hits

As described earlier, the control logic 320 uses the table 330 to track a number of allocated entries in queue 310 with an asserted cache hit field 250 corresponding to a particular entry with an asserted cache load field 248. As shown, the first entry in table 330 stores an indication of entry 8, which has an asserted cache load field 248. In addition, this first entry of table 330 stores a count of one for a number of allocated entries in queue 310 with an asserted cache hit field 250 corresponding to entry 8. The count of one refers to entry 7. Similarly, the second entry in table 330 stores an indication of entry 32, which has an asserted cache load field 248. In addition, the second entry of table 330 stores a count of two for allocated entries 15 and 20 in queue 310 with an asserted cache hit field 250 corresponding to entry 32. The third entry stores an indication of entry 44 and a count of one corresponding to entry 43.

Referring again to case 2 described earlier, the control logic 320 accesses table 330 when the control logic 320 selects entry 8 for issue and determines the corresponding cache load field 248 stores an asserted value. The control logic 320 searches table 330 using an indication of entry 8 of queue 310, finds the first entry, and determines there is currently one request allocated in queue 310, which is dependent upon the request in entry 8. In this case, the count of one corresponds to entry 7. When the control logic 320 determines at least one other allocated entry in table 330 stores a higher count, such as the second entry with a count of two, in some embodiments, the control logic 320 does not perform the earlier steps of searching for other requests. Rather, the control logic 320 sends an expected uncompressed packet for entry 8 and performs no updates to fields of other entries. In addition, the control logic 320 invalidates the storage location in the address history cache storing at least a portion of the request address for the request allocated in entry 8. For example, the control logic 320 invalidates cache way 3 in the set indexed by the processor identifier 2 and the thread identifier 6. Therefore, later requests from a same source with a same portion of a request address do not hit in the address history cache.

The asserted value stored in the field 254 for entry 7 of queue 310 ensures that a packet later issued for entry 7 is an uncompressed packet. In other embodiments, when the control logic 320 determines at least one other allocated entry in table 330 stores a higher count, the control logic 320 searches for younger requests, such as entry 7, and clears or negates the cache hit field 250. The uncompressed packet for entry 8 does not include an indication of an asserted cache load field, so there is no loading of at least a portion of the request address (e.g., address 0x330) at the receiver. Therefore, if the control logic 320 selects entry 32 soon after entry 8, then the control logic 320 is still able to send the two packets for entries 15 and 20 as compressed packets at a later point in time. The control logic 320 did not clear the cache hit field 250 of the two packets for entries 15 and 20 when the control logic 320 issued entry 8 of queue 310.

In some embodiments, the control logic 320 used a threshold to determine whether one entry in table 330 has a higher count than another entry. In the above example, the control logic 320 used the threshold of zero. In other embodiments, the control logic 320 uses a positive, non-zero integer as a threshold. For example, if a threshold is three, then the control logic 320 considers a fifth entry (not shown) in table 330 with a count of 7 to be higher than a ninth entry (not shown) with a count of 3, since 7 is greater than 6 (count of 3+threshold of 3). However, the control logic 320 does not consider the fifth entry with the count of 7 to be higher than other entries with a count of at least 4, since 7 is not considered to be greater than 7 (count of 4+threshold of 3).

In some embodiments, the control logic 320 allocates a given entry in table 330 when the control logic 320 allocates a request with an asserted cache load field 248 in queue 310. The control logic 320 updates (increments) the corresponding count in the given entry in table 330 when requests with an asserted cache hit field 250 has a same request address as the request corresponding to the given entry. For example, the second entry of table 330 storing an indication of entry 32 of queue 310 increments its count to one when control logic 320 allocates entry 20 in queue 310. This count is incremented from one to two when control logic 320 allocates entry 15 in queue 310. In addition, the control logic 320 updates (decrements) the corresponding count as the control logic 320 issues corresponding compressed packets. For example, when external arbitration logic selects entry 15 to issue and a compressed outbound packet is sent across the link for entry 15, control logic 320 decrements the count from two to one in the second entry of table 330.

In some embodiments, the given entry in table 330 is deallocated when control logic 320 issues the request for the indicated entry of queue 310 without updating fields of other entries in queue 310 due to the higher count condition. In other embodiments, the given entry in table 330 is deallocated when control logic 320 allocates a younger request with an asserted cache load field 248 in queue 310 and the count reaches zero for the given entry. In such a case, there are no more compressed packets to issue, so the control logic deallocates, or invalidates, the given entry.

Figure 4:
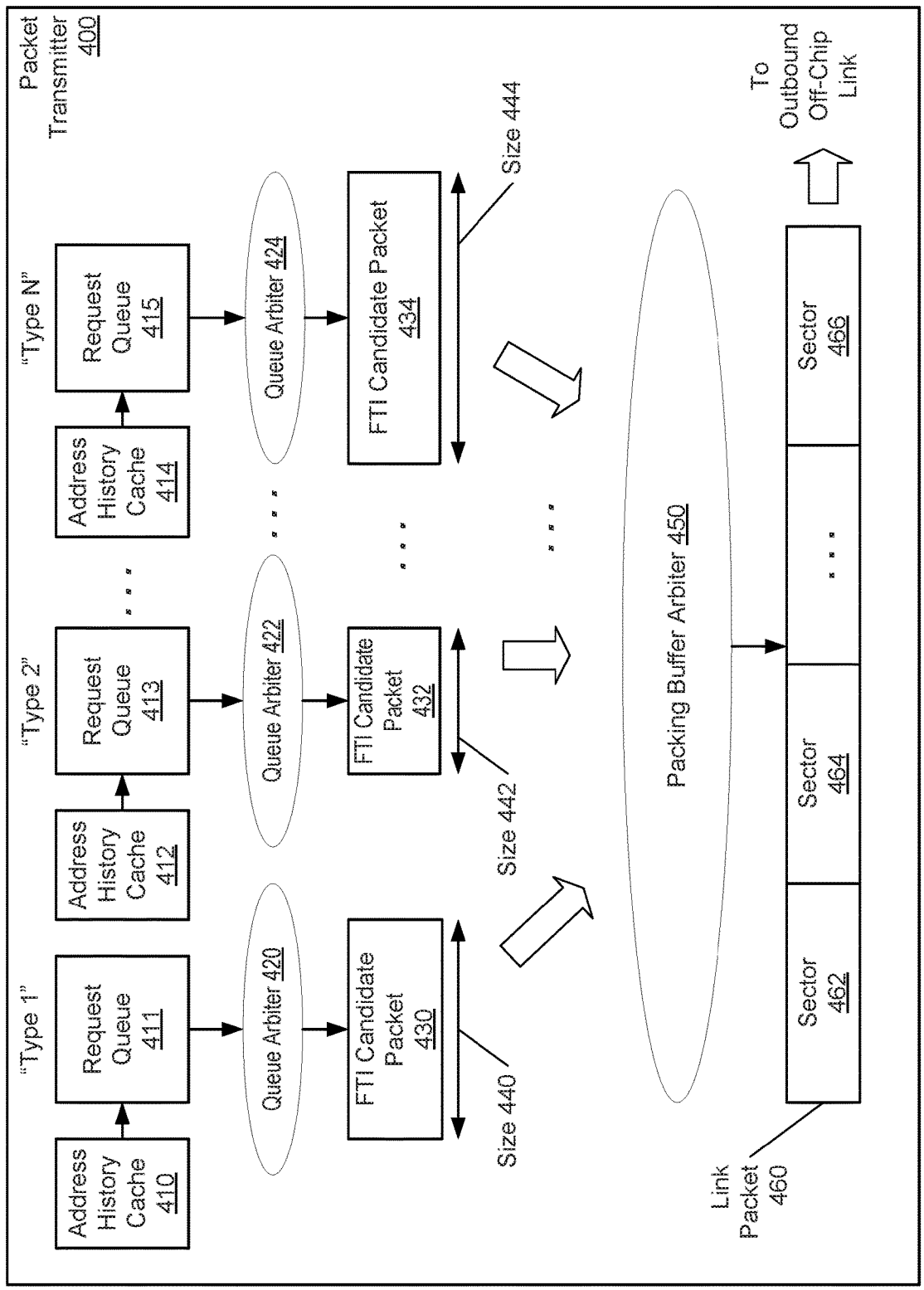
FIG. 4 is a block diagram of one embodiment of a packet transmitter.

Referring to FIG. 4, a generalized block diagram of one embodiment of a packet transmitter 400 is shown. Packet transmitter 400 includes request queues 411, 413 and 415, each for storing requests of a respective type. Each of the request queues 411, 413 and 415 has a corresponding local address history cache 410, 412 and 414. The local address history caches 410, 412 and 414 store request addresses. In other embodiments, one or more of the request queues 411, 413 and 415 do not use a corresponding local address history cache.

The requests stored in the request queues 411, 413 and 415 are a type of packet known as a flow control unit ("flit"). A flit is a subset of a larger packet. Flits generally carry data and control information, such as header and tail information for a larger packet. Although the data for transmission is described as packets routed in a network, in some embodiments, the data for transmission is a bit stream or a byte stream in a point-to-point interconnection. Request queues 411, 413 and 415 store control packets for control logic to send on a fabric link. Another source other than the packet transmitter 400 sends corresponding data packets, such as the larger packets corresponding to flits.

In some cases, one or more other sources, such as a source for the larger, data packets, share a fabric link with packet transmitter 400. Therefore, the fabric link is not always available for sending control packets. Packet transmitter 400 also includes packing buffer arbiter 450 for inserting one or more of the candidate packets 430-434 into link packet 460. Link packet 460 has sufficient data storage space for storing two or more of the FTI candidate packets 430-434. Packet transmitter 400 sends link packet 460 on the fabric link when control logic determines two requirements are satisfied. The first requirement is the fabric transport interface sends a signal to packet transmitter 400 indicating that the fabric link is available. The second requirement is packet transmitter 400 determines the link packet 460 is not empty.

Examples of control packet types stored in queues 411-415 are a request type, a response type, a probe type, and a token or credit type. Other examples of packet types are also possible and contemplated. As shown, queue 411 stores packets of "Type 1," which is a control request type, in one example. Queue 413 stores packets of "Type 2," which is a control response type in some cases, and queue 415 stores packets of "Type N," which is a control token or credit type in some cases.

Queue arbiter 420 selects FTI candidate packet 430 from queue 411. In some embodiments, queue arbiter 420 selects FTI candidate packet 430 based on one or more attributes. Examples of the attributes are an age, a priority level of the packet type, a priority level of the packet, a quality-of-service parameter, a source identifier, an application identifier or type, such as a real-time application, an indication of traffic type, such as real-time traffic, a bandwidth requirement or a latency tolerance requirement, and so forth. In a similar manner, queue arbiters 422-424 select FTI candidate packets 432-434 from queues 413 and 415.

As shown, each of the FTI candidate packets 430-434 has different data sizes 440-444. In some cases, two or more of the FTI candidate packets 430-434 have a same data size. One or more of the queues 411, 413 and 415 are capable of storing FTI packets of different sizes. Therefore, when a given one of the queue arbiters 420-424 selects a FTI candidate packet, the selected FTI candidate packet has a different size than a previous selected FTI candidate packet selected from the same queue. In an example, when queue 411 stores packets of a request type, queue 411 stores uncompressed request packets with a size of 128 bits, and stores compressed request packets with a size of 64 bits. Therefore, some entries of queue 411 store FTI candidate packets with data sizes different from data size 440.

Link packet 460 is partitioned into sectors 462-466. In one example, each sector is 32 bits. Other data sizes for the sectors 462-466 are possible and contemplated. In one example, link packet 460 includes eight sectors. It is also possible for any other number of sectors to be included in link packet 460. Link packet 460 is stored in registers or other sequential storage elements. In addition to storing data, such as the control FTI candidate packets, link packet 460 also stores other metadata (not shown). An example of the other metadata is an indication of which one(s) of the sectors 462-466 are available. Packing buffer arbiter 450 receives FTI candidate packets 430-434 and selects one or more of the received FTI candidate packets 430-434 for insertion in available data storage space in link packet 460.

Figure 5:
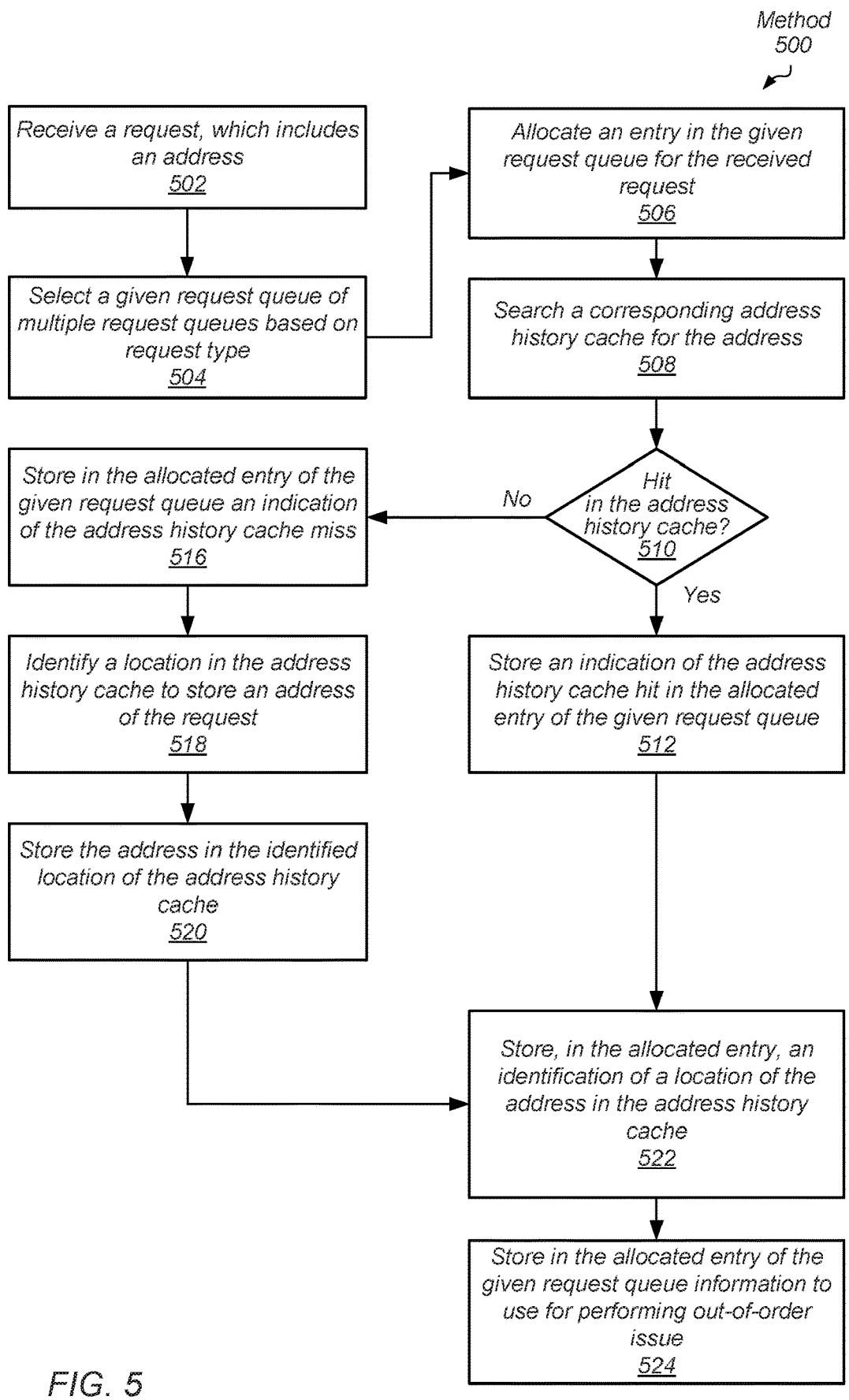
FIG. 5 is a flow diagram of another embodiment of a method for performing efficient data transfer in a computing system.

Referring now to FIG. 5, one embodiment of a method 500 for performing efficient data transfer in a computing system is shown. For purposes of discussion, the steps in this embodiment (as well as in FIGS. 6-8 and 10) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A packet transmitter receives a request, which includes an address (block 502). In some cases, the packet transmitter receives the request from an on-chip network or fabric, and the packet transmitter uses an outbound link for sending packets to an off-chip processor. Control logic in the packet transmitter selects a given request queue of multiple request queues based on request type (block 504). Control logic allocates the received request in the given request queue (block 506). In some cases, control logic allocates entries in an in-order manner, such that the entry position indicates an age of the corresponding request.

A search occurs for the address in a corresponding address history cache (block 508). A source identifier is used to index into the address history cache. In an embodiment, the source identifier includes a processor identifier and a thread identifier used to identify the processor executing the thread that generated the request. Control logic uses the source identifier to select an index in the address history cache, and the control logic uses a portion of the request address as a tag to determine whether one of multiple ways in the selected index stores the request address.

If there is a hit in the address history cache ("yes" branch of the conditional block 510), then an indication of the address history cache hit is stored in the allocated entry of the given request queue (block 512). In some cases, control logic updates a cache hit field to store an asserted value. For example, the cache hit field 250 (of FIG. 2 and FIG. 3) is used. An identification of a location of the address in the address history cache is stored in the allocated entry (block 522). For example, the cache hit identifies a particular way of multiple ways within the selected index of the address history cache. In an embodiment, the identification is the particular way found during the cache hit, and the identification of this particular way is stored in the allocated entry of the given request queue. For example, as described earlier, way 3 is stored in the request queue 300 (of FIG. 3).

Information to use for performing out-of-order issue from the given request queue is stored in the allocated entry of the given request queue (block 524). In an embodiment, if an older request is still allocated in the given request queue with an indication of a cache load, then an indication of a cache load match is stored in the allocated entry of the given request queue. In one example, control logic updates the cache load match field 254 (of FIG. 2 and of FIG. 3) with an asserted value.

If there is a miss in the address history cache ("no" branch of the conditional block 510), then an indication of the address history cache miss is stored in the allocated entry of the given request queue (block 516). In some cases, control logic updates a cache load field to store an asserted value. For example, the cache load field 248 (of FIG. 2 and of FIG. 3) is used. A location in the address history cache to store at least a portion of the request address of the request is identified (block 518). For example, a particular way of multiple ways within the selected index is identified. If an invalid way is not available, then one of the allocated ways is selected for replacement. For example, a least recently used (LRU) scheme is used.

At least a portion of the request address is stored in the identified location of the address history cache (block 520). Afterward, control flow of method 500 moves to block 522 where an identification of a storage location in the address history cache is stored in the allocated entry of the given request queue. The storage location stores the address of the request. An identifier of the particular way found during the cache hit is stored in the allocated entry of the given request queue. Afterward, control flow of method 500 moves from block 522 to block 524 where information used for performing out-of-order issue from the given request queue is stored in the allocated entry of the given request queue. In one example, if an older request is still allocated in the given request queue with an indication of a cache load, then an indication of a cache load match is stored in the allocated entry of the given request queue.

Figure 6:
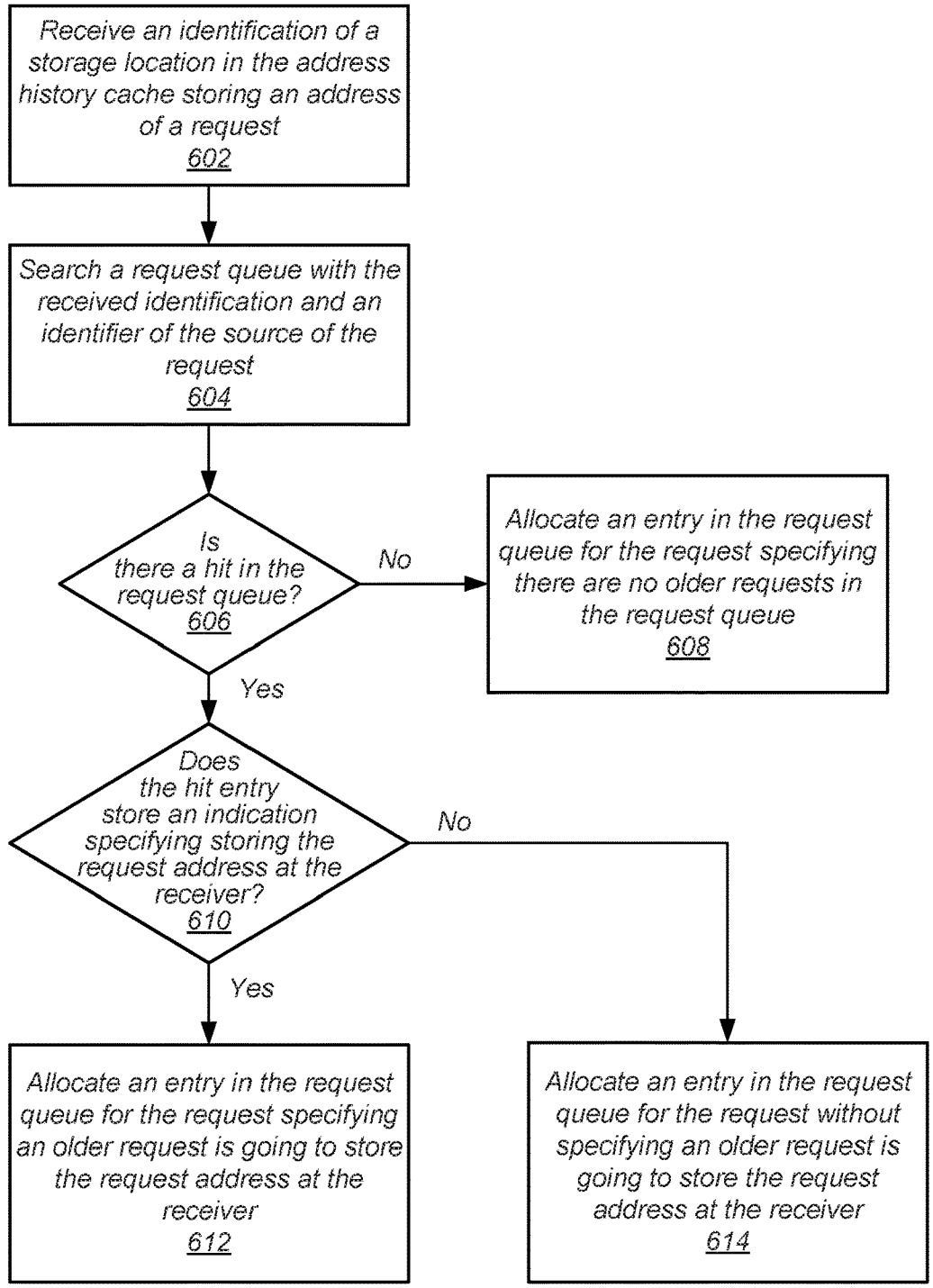
FIG. 6 is a flow diagram of another embodiment of a method for performing efficient data transfer in a computing system.

Turning now to FIG. 6, one embodiment of a method 600 for performing efficient data transfer in a computing system is shown. An identification of a storage location is received, which identifies the storage location in the address history cache storing an address of a request (block 602). Control logic for a request queue receives the identification of the storage location. In one embodiment, the received identification identifies the particular way in the address history cache storing at least a portion of a request address for a request received by a packet transmitter.

For example, way 3 is sent to the request queue 300 (of FIG. 3). The request queue is searched with the identification of the storage location and an identifier of the source of the request (block 604). As described earlier, the source identifier includes a processor identifier and a thread identifier used to identify the processor executing the thread that generated the request.

If there is a miss in the request queue ("no" branch of the conditional block 606), then an entry in the request queue is allocated for the request specifying there are no older requests in the request queue (block 608). For example, the allocated entry stores an indication of the hit/miss result for the address history cache for the request, but the cache load match field 254 (of FIG. 2 and FIG. 3) is updated with a cleared or negated value. However, if there is a hit in the request queue ("yes" branch of the conditional block 606), then a determination is made whether the hit entry stores an indication specifying storing the request address at the receiver. In one embodiment, the hit entry stores an asserted value in a cache load field 248 (of FIG. 2 and FIG. 3).

If the hit entry stores an indication specifying storing the request address at the receiver ("yes" branch of the conditional block 610), then an entry is allocated in the request queue for the request specifying an older request is going to store the request address at the receiver (block 612). For example, the allocated entry stores an indication of the hit/miss result for the address history cache for the request, and the cache load match field 254 (of FIG. 2 and FIG. 3) is updated with an asserted value. If there is a hit in the request queue ("yes" branch of the conditional block 606), and if the hit entry does not store an indication specifying storing the request address at the receiver ("no" branch of the conditional block 610), then an entry is allocated in the request queue. The allocated entry is for the request specifying no older request stored in the request queue is going to store the request address at the receiver (block 614). For example, the hit entry stores a cleared value in the cache load field 248 (of FIG. 2 and FIG. 3). The allocated entry stores an indication of the hit/miss result for the address history cache for the request, but the cache load match field 254 (of FIG. 2 and FIG. 3) is updated with a cleared or negated value.

Figure 7:
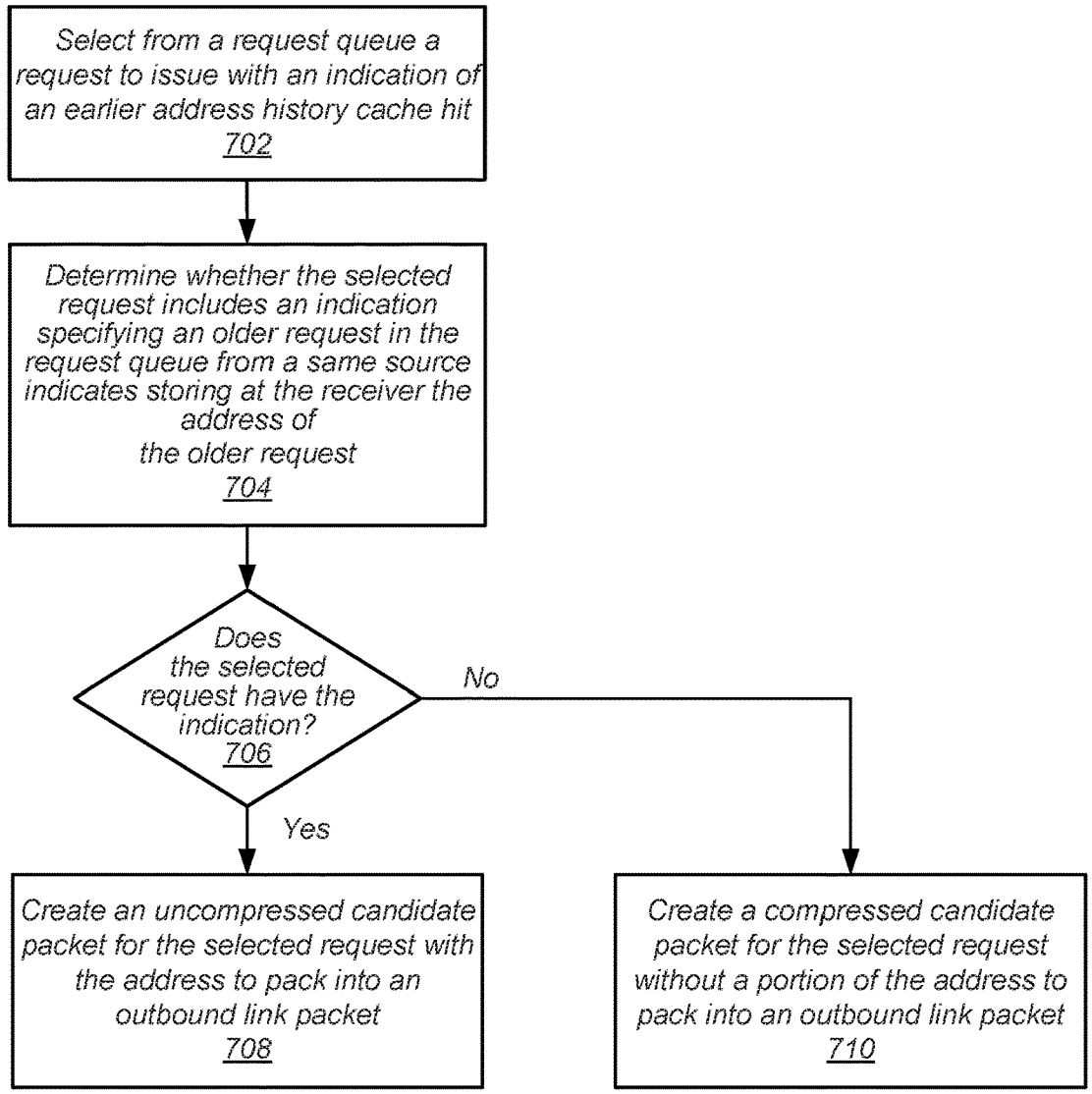
FIG. 7 is a flow diagram of another embodiment of a method for performing efficient data transfer in a computing system.

Turning now to FIG. 7, one embodiment of a method 700 for performing efficient data transfer in a computing system is shown. A request with an indication of an earlier address history cache hit is selected from a request queue to issue (block 702). In one embodiment, the selected request in the request queue stores an asserted value in the cache hit field 250 (of FIG. 2 and FIG. 3). It is determined whether the selected request includes an indication specifying an older request in the request queue from a same source indicates storing at the receiver the address of the older request (block 704). In one example, the indication is an asserted value stored in the cache load match field 254 (of FIG. 2 and FIG. 3).

If the selected request includes the above indication ("yes" branch of the conditional block 706), then an uncompressed candidate packet is created for the selected request with the address to pack into an outbound link packet (block 708). Despite having an earlier hit in the address history cache, the selected request is selected for issue prior the older request, which would store the request address at the receiver. Since this older request has not issued yet, the request address is not yet stored at the receiver.

If the selected request does not include the above indication ("no" branch of the conditional block 706), then a compressed candidate packet is created for the selected request without a portion of the address to pack into an outbound link packet (block 710). Since the selected request had an earlier hit in the address history cache, and the selected request is selected for issue after the older request, which stores the request address at the receiver, a compressed packet without at least a portion of the request address is sent to the receiver.

Figure 8:
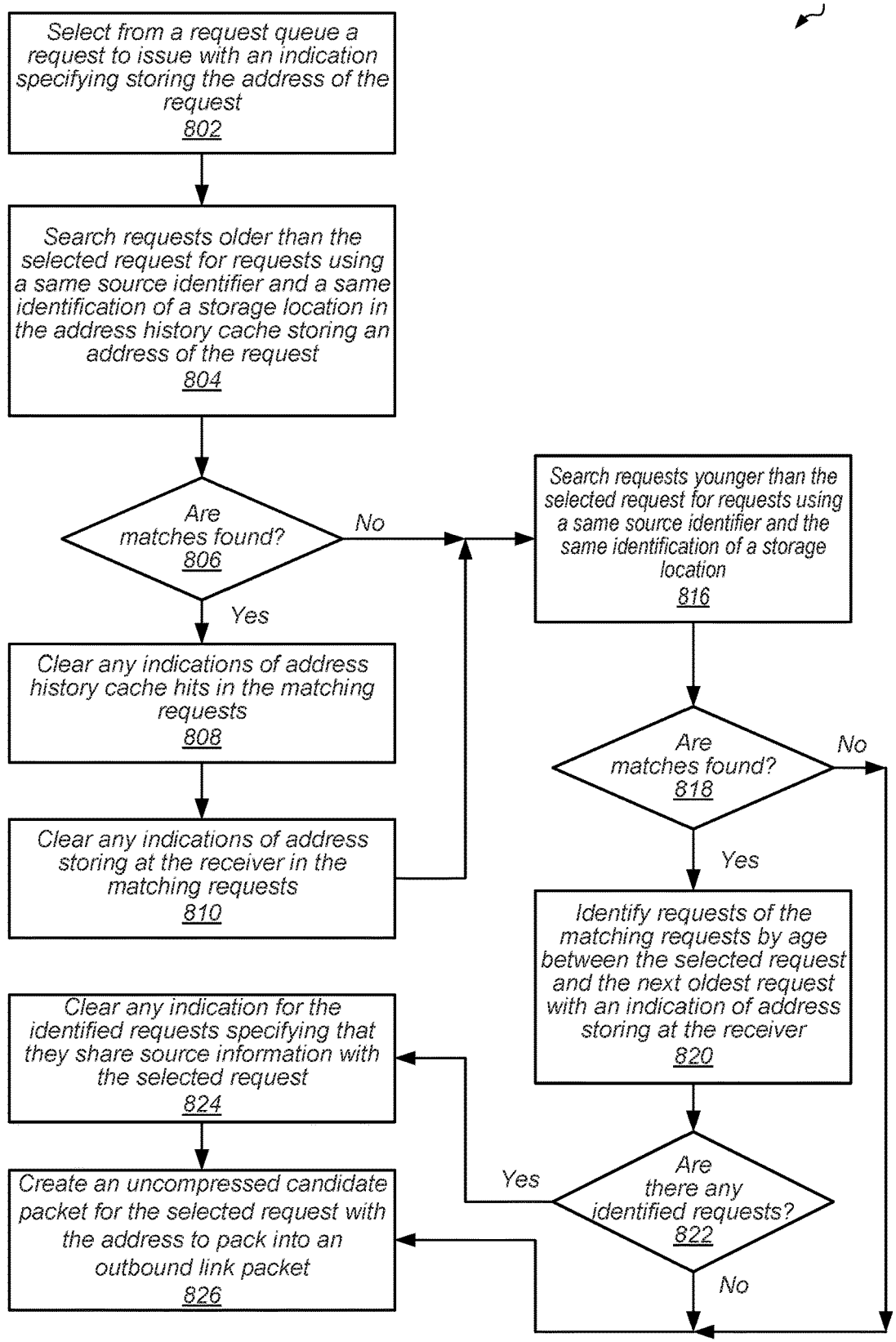
FIG. 8 is a flow diagram of another embodiment of a method for performing efficient data transfer in a computing system.

Turning now to FIG. 8, one embodiment of a method 800 for performing efficient data transfer in a computing system is shown. A request with an indication specifying storing the address of the request is selected to issue from a request queue (block 802). In one embodiment, the selected request in the request queue stores an asserted value in the cache load field 248 (of FIG. 2 and FIG. 3). Although the use of a table, such as table 330 described earlier for request queue 300, is not described here, in some cases, the selected request is qualified before other steps are performed. For example, the selected request is considered to be qualified if the selected request is found to have a higher count of corresponding requests with an asserted cache hit field and using a same request address as the selected request than other pending requests with counts. Control logic searches requests older than the selected request for requests from a same source identifier and using a same identification of the storage location in the address history cache (block 804). For example, the control logic searches the older requests for requests with a same source identifier and a same identification of the storage location (cache way) as the selected request.

If the above search finds matches ("yes" branch of the conditional block 806), then any indications of address history cache hits in the matching requests are cleared (block 808). In addition, in some embodiments, control logic in the packet receiver clears any indications of address storing at the receiver in the matching requests (block 810). Referring again to the examples of cases in the request queue 300 (of FIG. 3), blocks 806-810 of method 800 are similar to the steps for cases 2-4 (of FIG. 3) during the searching for older requests from a same source and using a same storage location in the address history cache.

If control logic does not find matches from the above search ("no" branch of the conditional block 806), or the control logic completed the clearing of indications for one or more older requests (blocks 808 and 810), then the control logic performs another search. For example, the control logic searches requests younger than the selected request for requests from a same source identifier and using the same identification of the storage location in the address history cache (block 816). In one embodiment, the control logic searches the younger requests for requests using a same source identifier and a same identification of the storage location (cache way) as the selected request. If matches are found from this search ("yes" branch of the conditional block 818), then requests of the matching requests are identified by age between the selected request and the next oldest request with an indication of address storing at the receiver (block 820). Referring briefly again to the examples in FIG. 3, and case 3, for the selected entry 32, the control logic identified the still-allocated younger entries 15 and 20 between still-allocated entry 8 and the selected entry 32.

If there are any identified requests ("yes" branch of the conditional block 822), then any indication for the identified requests specifying that they share same source information with the selected request is cleared (block 824). The source information includes a source identifier and an identification of the storage location in the address history cache. In one embodiment, the source identifier includes at least a processor identifier and a thread identifier. In some cases, a cache load match field is cleared or negated for these identified requests. Therefore, at a later point in time, when arbitration logic selects the one or more identified requests for issue, control logic creates a compressed packet. A compressed packet is created at such a time, since the request address or a portion of the request address is stored in the remote address history cache at the receiver due to the current (and older) selected request being issued.

If there are no identified requests ("no" branch of the conditional block 822), then control flow of method 800 moves to block 826 where an uncompressed candidate packet for the selected request is created with the address to pack into an outbound link packet. Referring again to the examples of cases in the request queue 300 (of FIG. 3), blocks 816-824 in method 800 are similar to the steps for cases 2-4 during the searching for younger requests from a same source and using a same storage location in the address history cache. As described earlier, the control logic searches requests that are younger than the selected request for those that have a same source identifier and use the same identification of the storage location in the address history cache (block 816). If matches are not found from this search ("no" branch of the conditional block 818), then control flow of method 800 moves to block 826 where an uncompressed candidate packet for the selected request is created with the address to pack into an outbound link packet.

Figure 9:
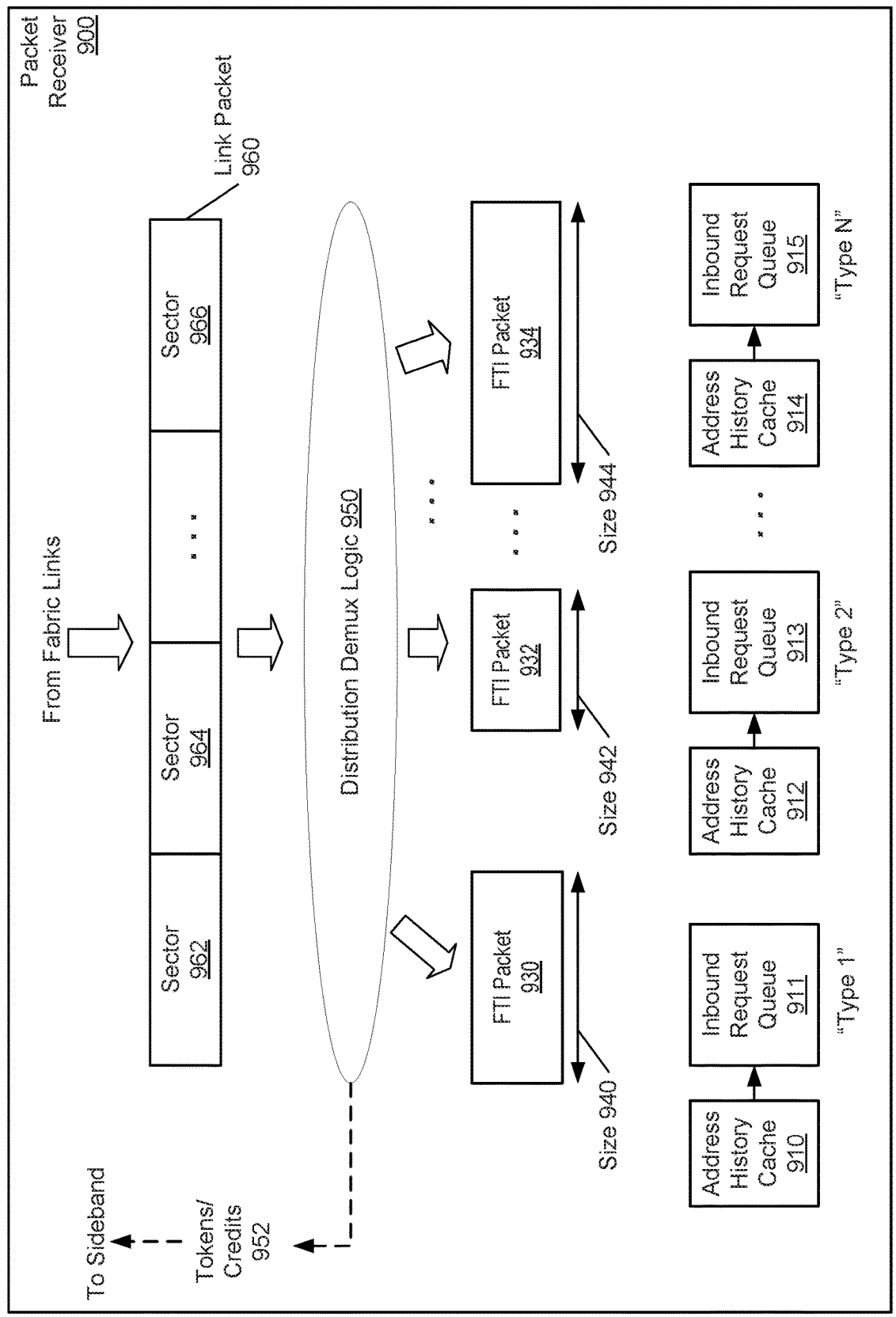
FIG. 9 is a block diagram of one embodiment of a packet receiver.

Referring to FIG. 9, a generalized block diagram of one embodiment of a packet receiver 900 is shown. In the illustrated embodiment, packet receiver 900 includes queues 911, 913 and 915, each for storing packets of a respective type. As shown, each of the request queues 911, 913 and 915 has a corresponding address history cache 910, 912 and 914. The address history caches 910, 912 and 914 store request addresses used for received compressed packets.

As shown, packet receiver 900 receives link packet 960 from the fabric link. Link packet 960 has sufficient data storage space for storing two or more FTI packets. Distribution demux logic 950 (or logic 950) analyzes the sectors 962-966 in link packet 900, determines how many FTI control packets are in link packet 960 and where they are located in link packet 960, and sends the FTI control packets to queues 911, 913 and 915 for storage. Examples of control packet types stored in queues 910-914 include request type, response type, probe type, and token or credit type. Other examples of packet types are also included in other embodiments. As shown, queue 911 stores packets of "Type 1," queue 913 stores packets of "Type 2," and queue 915 stores packets of "Type N."

Link packet 960 is partitioned into sectors 962-966. In one example, each sector is 32 bits. Other data sizes for the sectors 962-966 are possible and contemplated. In addition to storing data such as control FTI packets, other metadata (not shown) is stored. Examples of the other metadata are an indication of allocated sectors among the sectors 962-966 and an indication of where control FTI packets begin, since the control FTI packets have varying data sizes in some embodiments. In various embodiments, logic 950 includes a combination of combinatorial logic and sequential elements. Logic 950 is implemented in hardware, software, or a combination. Logic 950 removes one or more control FTI packets from link packet 960 and sends them to queues 911, 913 and 915.

In some cases, each of the FTI candidate packets 930-934 has different data sizes 940-944. In other cases, two or more of the FTI candidate packets 930-934 have a same data size. In an embodiment, one or more of the queues 911-915 stores FTI packets of different sizes. Therefore, when logic 950 sends a FTI packet, such as FTI packet 930 to queue 911, the FTI packet has a different size than a previous FTI packet sent to the same queue. In an example, when queue 911 stores packets of a request type, queue 911 stores uncompressed request packets with a size of 128 bits, and stores compressed request packets with a size of 64 bits. Therefore, some entries of queue 911 store FTI candidate packets with data sizes different from data size 940.

In various embodiments, one or more of the FTI candidate packets 930-934 is a compressed packet, which do not store at least a portion of the request address. For compressed packets, logic 950 accesses a corresponding one of the address history caches 910-914 for retrieving the portion of the request address absent in the compressed packet sent over the link. In some cases, a compressed packet includes an indication specifying that it is a compressed packet. As described earlier, an asserted value for the cache hit field 250 indicates that at least a portion of the request address is stored in a corresponding one of the address history caches 910-914, rather than stored within the compressed packet. By transporting the compressed packet without at least a portion of the request address, link efficiency increases.

In some embodiments, an uncompressed packet of the FTI candidate packets 930-934 includes an indication to store at least a portion of the request address within the uncompressed packet in a corresponding one of the address history caches 910-914. As described earlier, the cache load field 248 indicates to logic 950 that logic 950 stores at least a portion of the request address in a corresponding one of the address history caches 910-914. The logic 950 uses the stored portion of the request address for compressed packets received at a later point in time.

In various embodiments, each of the queues 911-915 include control logic (not shown) for maintaining a number of available entries for allocation. Entries of the queues 911-915 include valid bits to indicate available entries. In some cases, a negated value stored in the valid fields indicates an available entry, whereas an asserted value stored in the valid fields indicates an allocated entry. In some embodiments, the control logic in the queues 911-915 determine a number of tokens or credits 952 based on the number of available entries. The control logic sends the values for the tokens 952 to packet transmitters on the other side of one or more links. For example, the packet receiver 900 uses a sideband for sending the tokens 952 to the packet transmitter.

Figure 10:
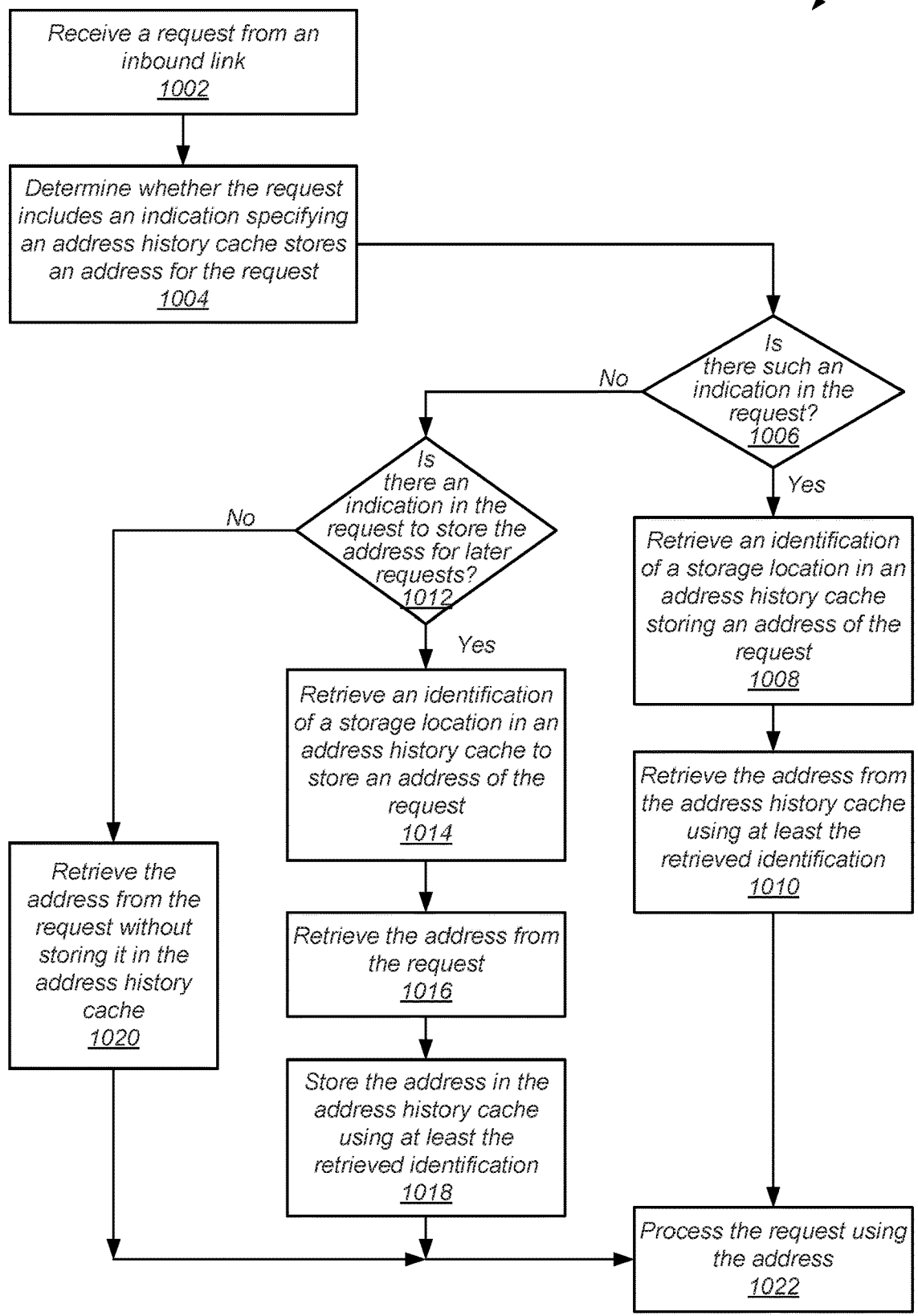
FIG. 10 is a flow diagram of another embodiment of a method for performing efficient data transfer in a computing system.

Referring now to FIG. 10, one embodiment of a method 1000 for performing efficient data transfer in a computing system is shown. A request is received from an inbound link (block 1002). A packet receiver receives the request on the link from a packet transmitter. The packet receiver determines whether the request includes an indication specifying an address history cache stores an address for the request (block 1004). The received request stores an indication specifying whether the request is in a compressed packet, which does not include at least a portion of the request address. As described earlier, in some cases, the cache hit field 250 stores this indication. If there is such an indication included in the request ("yes" branch of the conditional block 1006), then the packet receiver retrieves an identification of the storage location in an address history cache storing an address of the request (block 1008). In one embodiment, the request includes a cache way. When combined with a source identifier, the cache way identifies a particular storage location in an address history cache in the packet receiver.

Control logic in the packet receiver retrieves the address from the address history cache using at least the identification of the storage location in the address history cache (block 1010). For example, the control logic uses a source identifier for selecting a particular index in the address history cache and selects a particular way within the particular index using the cache way included in the request. Afterward, the packet receiver processes the request using the retrieved address (block 1022).

If there is not an indication included in the request specifying an address history cache stores an address for the request ("no" branch of the conditional block 1006), then is the packet receiver determines whether there is an indication in the request to store the address for later requests. As described earlier, in one embodiment, the packet receiver uses the cache load field 248 to make the determination. If there is such an indication ("yes" branch of the conditional block 1012), then the packet receiver retrieves an identification of the storage location in the address history cache from the request (block 1014). The packet receiver retrieves the address from the request (block 1016), and stores the address in the address history cache using the identification of the storage location (block 1018). As described earlier, a source identifier is also used. For example, the packet receiver uses the source identifier to select a particular index in the address history cache and selects a particular way within the particular index using the cache way included in the request. Afterward, the packet receiver processes the request using the retrieved address (block 1022).

If there is not an indication specifying that the address is to be stored in a corresponding address history cache ("no" branch of the conditional block 1012), then the packet receiver retrieves the address from the request without storing the address in any address history cache (block 1020). In one embodiment, the packet receiver inspects each of the cache load field 248 and the cache hit field 250, which were described earlier, and determines each field stores a negated or cleared value. In such cases, the packet receiver does not use the address history caches for processing the request (block 1022).

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a plurality of queues, each configured to store requests to be issued to a receiver; and
circuitry configured to:
select, from a queue of the plurality of queues, a first entry that stores:
a first request that comprises an address; and
an indication that the first request is to be conveyed in a compressed packet without at least a portion of the address; and
change the indication in the first entry to indicate that the first request is to be conveyed with the portion of the address in an uncompressed packet, responsive to identification of a second entry that stores:
a second request that comprises the address; and
an indication that the second request is to be conveyed in an uncompressed packet with the address.

2. The apparatus as recited in claim 1, wherein the second request is older than the first request, and the circuitry is configured to change the indication in the first entry responsive to servicing the first request prior to the second request.

3. The apparatus as recited in claim 1, wherein the circuitry is further configured to change the indication in the second entry to indicate that the second request is to be conveyed in a compressed packet without the portion of the address, in response to determining.

4. The apparatus as recited in claim 3, wherein in response to the address not being found in an address history cache, the circuitry is further configured to:
store an indication in the first entry that the address was not found in the address history cache;
identify a location in the address history cache to store at least a portion of the address;
store the portion of the address in the location; and
store in the first entry an identification of said location.

5. The apparatus as recited in claim 1, wherein:
the indication in the second entry further indicates the second request has a same source as the first request; and
in response to determining the first request is selected for issue, the circuitry is further configured to search for one or more matching older requests older than the first request with allocated entries in a selected queue, wherein the one or more matching older requests have a same source and a same identification of a location in an address history cache as the first request.

6. The apparatus as recited in claim 5, wherein in response to finding the one or more matching older requests, the circuitry is further configured to:
clear any indications of address history cache hits in the allocated entries of the one or more matching older requests; and
clear any indications of address storing at the receiver in the allocated entries of the one or more matching older requests.

7. The apparatus as recited in claim 5, wherein in response to determining the first request is selected for issue, the circuitry is further configured to search for a plurality of matching younger requests younger than the first request with allocated entries in the selected queue, wherein the plurality of matching younger requests have a same source and a same identification of a location in the address history cache as the first request.

8. The apparatus as recited in claim 1, wherein the circuitry is further configured to create the compressed packet corresponding to the second request with an identification of a location of the address in an address history cache.

9. A method, comprising:
storing requests in a plurality of queues, each configured to store requests to be issued to a receiver;
selecting, from a queue of the plurality of queues, a first entry that stores:
a first request that comprises an address; and
an indication that the first request is to be conveyed in a compressed packet without at least a portion of the address; and
changing the indication in the first entry to indicate that the first request is to be conveyed with the portion of the address in an uncompressed packet, responsive to identification of a second entry that stores:
a second request that comprises the address; and
an indication that the second request is to be conveyed in an uncompressed packet with the address.

10. The method as recited in claim 9, wherein the second request is older than the first request, and the method comprises changing the indication in the first entry responsive to servicing the first request prior to the second request.

11. The method as recited in claim 10, further comprising:
changing the indication in the second entry to indicate creation of a compressed packet corresponding to the second request, wherein the compressed packet comprises a portion of the address that is less than an entirety of the address, in response to determining:
the first request is selected for issue; and
the first entry does not include an indication that the address was found in an address history cache.

12. The method as recited in claim 9, wherein in response to the address comprised within the first request not being found in an address history cache, the method further comprises:
storing an indication in the first entry that the address was not found in the address history cache;
identifying a location in the address history cache to store at least a portion of the address;
storing the portion of the address in the location; and
storing in the first entry an identification of said location.

13. The method as recited in claim 9, further comprising:
indicating, by the indication in the second entry, the second request has a same source as the first request; and
searching, in response to determining the first request is selected for issue, for one or more matching older requests older than the first request with allocated entries in a selected queue, wherein the one or more matching older requests have a same source and a same identification of a location in an address history cache as the first request.

14. The method as recited in claim 13, wherein in response to finding the one or more matching older requests, the method further comprises:
clearing any indications of address history cache hits in the allocated entries of the one or more matching older requests; and
clearing any indications of address storing at the receiver in the allocated entries of the one or more matching older requests.

15. The method as recited in claim 13, wherein in response to determining the first request is selected for issue, the method further comprises searching for a plurality of matching younger requests younger than the first request with allocated entries in a queue, wherein the plurality of matching younger requests have a same source and a same identification of a location in the address history cache as the first request.

16. A non-transitory computer readable storage medium storing program instructions, wherein the program instructions are executable by a processor to:
    store requests in a plurality of queues, each configured to store requests to be issued to a receiver;
    select, from a queue of the plurality of queues, a first entry that stores:
        a first request that comprises an address; and
        an indication that the first request is to be conveyed in a compressed packet without at least a portion of the address;
    change the indication in the first entry to indicate that the first request is to be conveyed with the portion of the address in an uncompressed packet, responsive to identification of a second entry that stores:
        a second request that comprises the address; and
        an indication that the second request is to be conveyed in an uncompressed packet with the address.

17. The non-transitory computer readable storage medium as recited in claim 16, wherein the indication stored in the second entry is configured to indicate whether the second request is an older request than the first request.

18. The non-transitory computer readable storage medium as recited in claim 16, wherein the program instructions are executable by the processor to change the indication stored in the second entry to indicate creation of a compressed packet, wherein the compressed packet comprises a portion of the address that is less than an entirety of the address, in response to determining:
    the first request is selected for issue; and
    the first entry does not include an indication that the address was found in an address history cache.

19. The non-transitory computer readable storage medium as recited in claim 18, wherein in response to the first entry not including an indication that the address was found in the address history cache, the program instructions are executable by the processor to:
    store an indication in the first entry that the address was not found in the address history cache;
    identify a location in the address history cache to store at least a portion of the address;
    store the portion of the address in the location; and
    store in the first entry an identification of said location.

20. The non-transitory computer readable storage medium as recited in claim 16, wherein:
    the indication stored in the second entry further indicates the second request has a same source as the first request; and
    in response to determining the first request is selected for issue, the program instructions are executable by the processor to search for one or more matching older requests older than the first request with allocated entries in a selected queue, wherein the one or more matching older requests have a same source and a same identification of a location in an address history cache as the first request.

* * * * *